US011238870B2

(12) United States Patent
Xu

(10) Patent No.: US 11,238,870 B2
(45) Date of Patent: Feb. 1, 2022

(54) INTERACTION METHOD, ELECTRONIC DEVICE, AND SERVER

(71) Applicant: Alibaba Group Holding Limited, George Town (KY)

(72) Inventor: Yi Xu, Hangzhou (CN)

(73) Assignee: Alibaba Group Holding Limited

( * ) Notice: Subject to any disclaimer, the term of this patent is extended or adjusted under 35 U.S.C. 154(b) by 100 days.

(21) Appl. No.: 16/733,019

(22) Filed: Jan. 2, 2020

(65) Prior Publication Data

US 2020/0211572 A1 Jul. 2, 2020

Related U.S. Application Data

(63) Continuation-in-part of application No. PCT/CN2018/093231, filed on Jun. 28, 2018.

(30) Foreign Application Priority Data

Jul. 5, 2017 (CN) ......................... 201710542032.8

(51) Int. Cl.

*G10L 17/22* (2013.01)
*G06F 21/32* (2013.01)
*G10L 17/02* (2013.01)
*G10L 17/06* (2013.01)
*G10L 17/00* (2013.01)
*H04L 29/08* (2006.01)
*H04L 29/06* (2006.01)

(52) U.S. Cl.

CPC .............. *G10L 17/22* (2013.01); *G06F 21/32* (2013.01); *G10L 17/00* (2013.01); *G10L 17/02* (2013.01); *G10L 17/06* (2013.01); *H04L 67/306* (2013.01); *H04L 67/42* (2013.01)

(58) Field of Classification Search

CPC ......... G10L 17/22; G10L 17/00; G10L 17/02; G10L 17/06; G10L 17/18; G10L 2015/223; G06F 21/32; H04L 67/306; H04L 67/42; H04L 67/303

USPC .................................................. 704/243, 275

See application file for complete search history.

(56) References Cited

U.S. PATENT DOCUMENTS

| | | | | |
|---|---|---|---|---|
| 7,657,431 | B2 | 2/2010 | Hayakawa | |
| 8,510,103 | B2 | 8/2013 | Angott | |
| 9,098,467 | B1 * | 8/2015 | Blanksteen | G06F 3/167 |
| 10,049,675 | B2 * | 8/2018 | Haughay | G10L 17/00 |
| 10,446,143 | B2 * | 10/2019 | Akbacak | G10L 15/08 |

(Continued)

FOREIGN PATENT DOCUMENTS

| | | |
|---|---|---|
| CN | 103761462 | 4/2014 |
| CN | 105374355 | 3/2016 |

(Continued)

*Primary Examiner* — Akwasi M Sarpong

(74) *Attorney, Agent, or Firm* — Van Pelt, Yi & James LLP

(57) ABSTRACT

The present application discloses a method, device, system, and computer system for interfacing with a terminal in connection with performing a service function. The method includes receiving audio information based at least in part on a voice input from a user, determining a service function corresponding to the audio information, determining user information for the user based at least in part on the audio information, and performing the service function based at least in part on the user information.

18 Claims, 10 Drawing Sheets

(56) References Cited

U.S. PATENT DOCUMENTS

| | | | | |
|---|---|---|---|---|
| 2011/0143811 | A1* | 6/2011 | Rodriguez | G06K 9/228 455/556.1 |
| 2014/0222425 | A1* | 8/2014 | Park | G10L 15/24 704/243 |
| 2015/0162006 | A1* | 6/2015 | Kummer | H04N 21/47217 704/275 |
| 2016/0219122 | A1* | 7/2016 | Siliski | G06F 16/27 |
| 2019/0172479 | A1* | 6/2019 | Xiao | G06F 17/18 |
| 2019/0267004 | A1* | 8/2019 | Lee | G06K 9/00228 |
| 2019/0318744 | A1 | 10/2019 | Bromand | |

FOREIGN PATENT DOCUMENTS

| | | |
|---|---|---|
| CN | 105719646 | 6/2016 |
| CN | 105810200 | 7/2016 |
| CN | 106682090 | 5/2017 |
| CN | 106875944 | 6/2017 |
| CN | 107481720 | 12/2017 |

* cited by examiner

200

700

800

900

INTERACTION METHOD, ELECTRONIC DEVICE, AND SERVER

CROSS REFERENCE TO OTHER APPLICATIONS

This application is a continuation-in-part of and claims priority to International (PCT) Application No. PCT/CN2018/093231 entitled INTERACTION METHOD, ELECTRONIC DEVICE, AND SERVER, filed Jun. 28, 2018 which is incorporated herein by reference for all purposes, which claims priority to China Application No. 201710542032.8 entitled AN INTERACTION METHOD, ELECTRONIC DEVICE AND SERVER, filed Jul. 5, 2017 which is incorporated herein by reference for all purposes.

FIELD OF THE INVENTION

The present application relates to a field of computer technology. In particular, the present application relates to an interaction method, an electronic device, a server, and a machine-readable medium.

BACKGROUND OF THE INVENTION

As the use of big data becomes more widely adopted and more important with respect to analyzing trends and/or providing services, an ever-increasing number of platforms are used to summarize behavioral characteristics of users by analyzing user historical data. Such platforms are also pushing appropriate information (e.g., provide services) to users based on the behavioral characteristics. An example, as a user shops online via a terminal, a corresponding online shopping platform can analyze the user's past orders and thus determine various user characteristics pertaining to the user such as the product types that the user is deemed to find more interesting as well as the spending capabilities or trends of the user. Accordingly, as the user is browsing a page on an online shopping platform, the online shopping platform can provide recommendations during the user's shopping experience (e.g., provide product recommendations that are determined to be of interest to the user).

According to related art, users register account information for the users on platforms. For example, the user can manually define a user profile (or portion thereof) on the corresponding platform. The user profile can be defined in connection with a registration process for the user on the platform. After a user registers the account information with the platform, the data generated by the user on the platform can be associated with the registered account information. Data generated by the user can include historical data such as historical purchases or browsing history of the user with respect to the platform. The platform can analyze the historical data associated with the account information and thereby obtain the behavioral characteristics of the user corresponding to the account information.

According to related art, data analysis with respect to providing user recommendations on a platform is generally conducted in relation to account information with the platform. If different users use the same account information, the service information pushed on the basis of the account information will not be very accurate. As an example, multiple members of a family can use a single registered account to shop on an e-commerce platform. According to the related art, the recommendations provided to a family member is determined based on the aggregated historical information or account information pertaining to the single registered account used by the multiple family members.

BRIEF DESCRIPTION OF THE DRAWINGS

Various embodiments of the invention are disclosed in the following detailed description and the accompanying drawings.

In order to provide a clearer explanation of the technical schemes in the prior art or in one or more embodiments of the present specification, simple introductions are given below to the drawings which are needed for the embodiments or the prior art. Obviously, the drawings described below are merely some embodiments recorded in the present specification. Persons with ordinary skill in the art could, without expending creative effort, obtain other drawings on the basis of these drawings.

DETAILED DESCRIPTION

Figure 1:
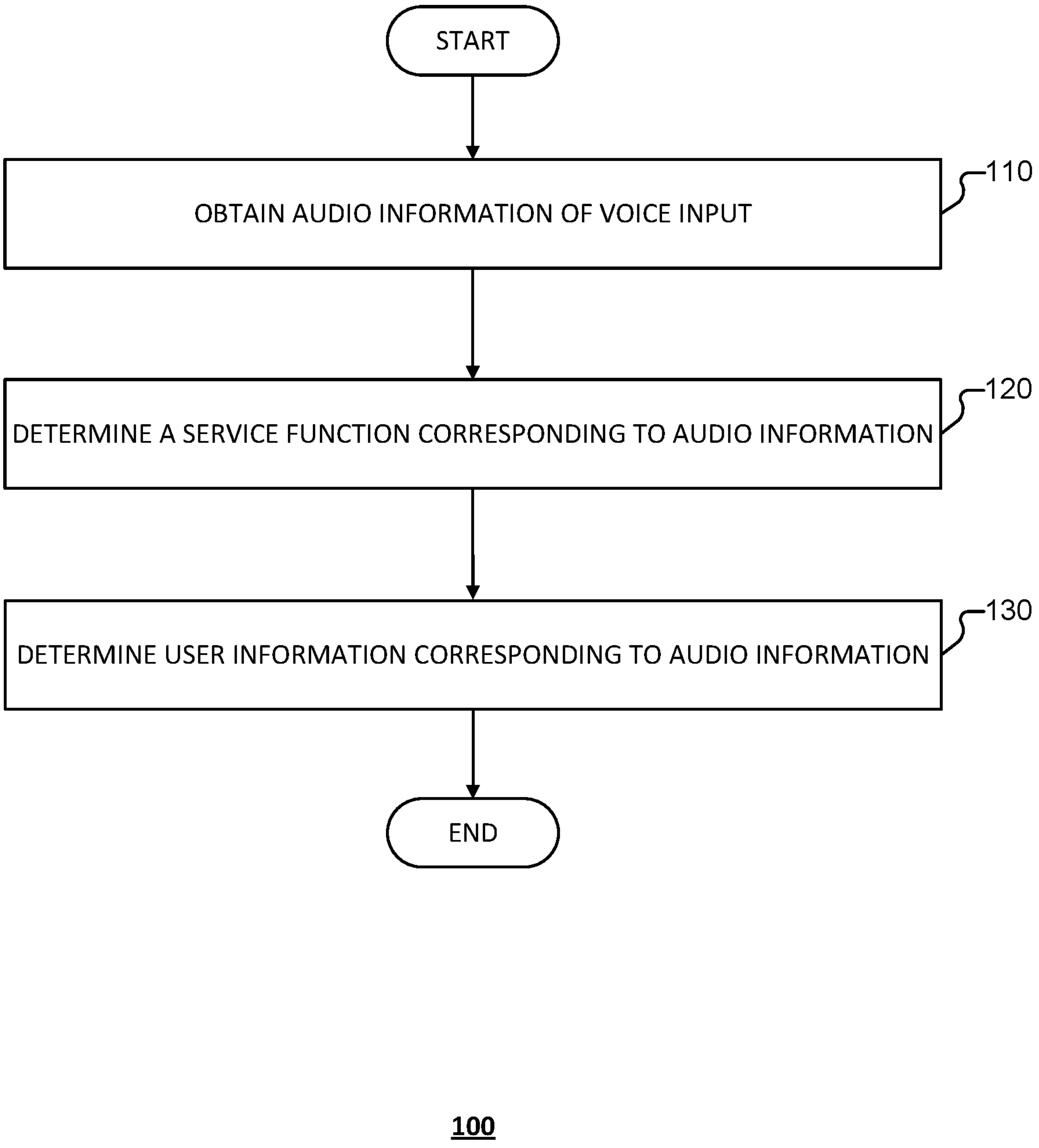
FIG. 1 is a flowchart of an interaction method according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order that persons skilled in the art should have a better understanding of the technical schemes of one or more embodiments in the present specification, the technical schemes in one or more embodiments in the present specification are described clearly and completely in light of the drawings of one or more embodiments in the present specification. Obviously, the embodiments described are only some of the embodiments in the present specification and are not all the embodiments. All other embodiments that are obtained by persons having ordinary skill in the art on the basis of one or more embodiments in the present specification should, so long as no additional creative effort is expended, fall within the scope of protection of one or more embodiments in the present specification.

As used herein, a "terminal" generally refers to a device comprising one or more processors. A terminal can be a device used (e.g., by a user) within a network system and used to communicate with one or more servers and/or one or more other devices connected to a network or directly connected to the terminal. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), a Point of Sale (POS) device, an mp3 player, a mobile medical device, a camera, a wearable device (e.g., a Head-Mounted Device (HMD), electronic clothes, electronic braces, an electronic necklace, an electronic accessory, an electronic tattoo, or a smart watch), an ATM, a kiosk such as a vending machine, a smart home appliance, vehicle-mounted mobile stations, or the like. A terminal can run various operating systems.

In addition, the sequence of steps in each of the method embodiments described below is merely an example and does not impose strict limits.

Various embodiments provide an interaction method with respect to a user interacting with one or more terminals. The interaction method can be applied in client (e.g., a terminal) and server system architectures. The client can be a terminal or other electronic device with an audio recording function. Specifically, for example, the client may be a desktop computer, a tablet, a notebook computer, a smart phone, a digital assistant, a smart wearable device, a shopping guide terminal, a television set, a smart speaker, or a microphone. Smart wearable devices include, but are not limited to, smart bracelets, smart watches, smart glasses, smart helmets, and smart necklaces. A client can also be software capable of running on the electronic devices above. For example, an electronic device provides an audio recording function, and the software records audio information by invoking the audio recording function.

In some embodiments, the client corresponds to, or is implemented on, a terminal configured to perform an audio recording function. Clients can have various capabilities and/or can be configured to perform various functions. Clients can be differentiated into the following categories according to differences in data processing capabilities of the various clients.

TABLE 1

| Category Number | Category | Example Devices | Data Processing Capabilities |
|---|---|---|---|
| 1 | Basic network devices | Internet of Things devices, edge node devices (e.g., connected security systems, smart thermostats) | Data collection and sending |
| 2 | Simple network devices | Smart wearable devices, POS (point of sale) machines | Data collection, sending, and simple data preprocessing (e.g., conduct transactions) |
| 3 | Inter-mediate network devices | Smart appliances and smart speakers | Data collection, sending, and medium-power data preprocessing (e.g., play media files) |
| 4 | Smart network devices | Relatively well performing smart phones and tablets | Data collection, sending, relatively-high-power data preprocessing, and data query matching (e.g., execute client applications) |
| 5 | High-per-formance network devices | Work stations and smart kiosks | Data collection, sending, data preprocessing, data query matching, and data storage (e.g., execute server applications, run databases) |

According to various embodiments, the hardware devices and/or software of clients corresponding to basic network devices (e.g., category 1 in Table 1 hereof) are relatively simple. Clients corresponding to basic network devices are configured to record audio through a microphone and/or generate audio information. The clients corresponding to basic network devices can be further configured to communicate the audio information. For example, the audio information generated by the client is sent to a server through a network communication module. A client corresponding to a basic network device can include (or be operatively connected to) a microphone, a network communication unit, a sensor, and a speaker. According to various embodiments, a client corresponding to a basic network device does not generally need to process data. For example, such a client is configured to receive an input such as a voice input and communicate an instruction to another terminal based on the input. In some embodiments, clients corresponding to a basic network device is equipped with other sensors for obtaining (e.g., determining) basic network device operating parameters. As an example, a client corresponding to a basic network device is an Internet of Things device or an edge node device.

According to various embodiments, the hardware and/or software of clients corresponding to a simple network device (e.g., category 2 in Table 1 hereof) are more complex than the hardware and/or software of clients corresponding to a basic network device, however, clients corresponding to a simple network device are relatively simplistic with limited functionality and processing capabilities. A client corresponding to a simple network device generally includes: a microphone, a network communication unit, a processor, memory, and a speaker. A client corresponding to a simple network device has more powerful data processing capability than a client corresponding to a basic network device. In some embodiments, a simple network device has a processor capable of processing simple logic operations. The client corresponding to the simple network device can be configured to receive an input or obtain data (e.g., contextual data such as an operating condition, a surrounding environment condition, etc.). The client corresponding to the simple network device can obtain the input via a microphone (e.g., a voice input), or a touch input to a touch screen or to a physical button or interface connected to the client. In response to obtaining the input or data, the client corresponding to a simple network device performs preliminary preprocessing on the data. For example, the client generates a feature matrix based on audio information. In some embodiments, a client corresponding to a simple network device includes (or is connected to and outputs information to) a display module. The display module of the client corresponding to a simple network device generally has a simple display function. Such a client is configured to use the display module to provide information and/or feedback to user of the client. As an example, a client corresponding to a simple network device is a smart wearable device (e.g., a smart bracelet, a relatively basic smart watch, smart glasses), a POS machine (e.g., a payment settlement device in an offline shopping setting such as at a coffee shop or a portable payment settlement device (such as a handheld POS machine or a settlement module attached to a handheld device).

According to various embodiments, the hardware and/or software of clients corresponding to an intermediate network device (e.g., category 3 in Table 1 hereof) are more complex than the hardware and/or software of clients corresponding to a basic network device or a simple network device, however, clients corresponding to an intermediate network device are relatively simplistic with limited functionality and processing capabilities. A client corresponding to an intermediate network device generally includes: a microphone, a network communication unit, a processor, memory, a display, and a speaker. The processor of an intermediate network device has a clock speed that is generally less than 2.0 GHz, a RAM capacity generally less than 2 GB, and memory capacity generally less than 128 GB. An intermediate network device can generally perform limited processing with respect to recorded audio information. The client corresponding to the intermediate network device can be configured to receive an input or obtain data (e.g., contextual data such as an operating condition, a surrounding environment condition, etc.). The client corresponding to the intermediate network device can obtain the input via a microphone (e.g., a voice input), or a touch input to a touch screen or to a physical button or interface connected to the client. In response to obtaining the input or data, such a client generates a feature matrix and performs further processing with respect to the feature matrix (e.g., endpoint detection processing, noise-reduction processing, speech recognition, etc.). As an example, a client corresponding to intermediate network device is a smart household appliances in a smart home, smart home terminals, smart speakers, relatively advanced smart watches, relatively basic smart phones, vehicle-mounted smart terminals, etc.

According to various embodiments, the hardware and/or software of clients corresponding to a smart network device (e.g., category 4 in Table 1 hereof) are more complex than the hardware and/or software of clients corresponding to a basic network device, a simple network device, or an intermediate network device. A smart network device has relatively advanced functionality or capabilities. A client corresponding to a smart network device generally includes a microphone, a network communication unit, a processor, memory, a display, and a speaker. Smart network devices may have more powerful data processing capabilities than an intermediate network device. The processor of a smart network device has a clock speed that is generally greater than 2.0 GHz, a RAM capacity generally less than 12 GB, and memory capacity generally less than 1 TB. The client corresponding to the smart network device can be configured to receive an input or obtain data (e.g., contextual data such as an operating condition, a surrounding environment condition, etc.). The client corresponding to the smart network device can obtain the input via a microphone (e.g., a voice input), or a touch input to a touch screen or to a physical button or interface connected to the client. In response to obtaining the input or data, such a client generates a feature matrix and performs further processing with respect to the feature matrix (e.g., endpoint detection processing, noise-reduction processing, speech recognition, or other processing). In some embodiments, a smart network device generates speech feature vectors based on audio information. According to various embodiments, a client corresponding to a smart network device determines (e.g., identifies) users based at least in part on matching speech feature vectors with user feature vectors. A smart network device can store or access mappings of information pertaining to a user (e.g., user feature information). The smart network device can determine a user corresponding to a voice input based on the mappings of information pertaining to users (e.g., by determining an entry in the mappings that corresponds to obtained voice input or audio information). However, such matching by the smart network device is generally limited to a limited number of user feature vectors, such as the user feature vectors of each family member in a household. Examples of a smart network device generally include: relatively well-performing smart phones, tablets, desktop computers, notebook computers, etc.

According to various embodiments, the hardware and/or software of clients corresponding to a high-performance network device (e.g., category 5 in Table 1 hereof) are more complex than the hardware and/or software of clients corresponding to a basic network device, a simple network device, an intermediate network device, or a smart network device. A high-performance network device generally has enormous data calculating and processing capabilities and provide powerful data storage capabilities. The processor of a high-performance network device has a clock speed that is generally greater than 3.0 GHz, a RAM capacity generally greater than 12 GB, and memory capacity generally greater than 1 TB. A high-performance network device can generate feature matrices or speech feature vectors from audio information and perform processing with respect to the feature matrices or speech feature vectors (e.g., endpoint detection processing, noise-reduction processing, and speech recognition, etc.). A high-performance device can match speech feature vectors to a large volume of stored user feature vectors. A high-performance network device can store or access mappings of information pertaining to users (e.g., user feature information). The high-performance network device can determine a user corresponding to a voice input based on the mappings of information pertaining to a user (e.g., by determining an entry in the mappings that corresponds to obtained voice input or audio information).

Examples of a high-performance network device may be a work station, a high-configuration desktop computer, a smart kiosk, a self-service machine, etc.

Of course, the clients described above are listed as examples only. As science and technology progress, the performances of hardware devices may rise, with the result that the electronic devices described above as having relatively weak data processing capabilities may gain more powerful processing capabilities. Therefore, the content in Table 1 cited by the embodiments below is merely illustrative for the purpose of reference and is not limiting.

According to various embodiments, a server is an electronic device having certain calculating and processing capabilities. The server can include one or more processors. In some embodiments, the server can have one or more virtual machines instantiated thereon. A server can have a network communication module, one or more processors, and memory. In some embodiments, the server is implemented as software running on an electronic device. In some embodiments, the server is implemented as a distributed server. A distributed server includes a collaborating system having multiple processors, memories, and network communication modules. In some embodiments, the server is implemented as a server cluster formed from a plurality of servers.

FIG. 1 is a flowchart of an interaction method according to various embodiments of the present application.

Referring to FIG. 1, process 100 for interacting with a terminal is provided. Process 100 can be implemented in connection with process 200 of FIG. 2, process 700 of FIG. 7, process 800 of FIG. 8, and/or process 900 of FIG. 9. Process 100 can be implemented at least in part by computer system 1000 of FIG. 10.

According to various embodiments, process 100 is implemented by a terminal. As an example, the terminal that implements process 100 corresponds to a client that is a simple network device, an intermediate network device, a smart network device, or a high-performance network device. In some embodiments, process 100 is performed by one or more servers (e.g., one or more servers connected to a terminal used by a user).

At 110, audio information of a voice input is obtained. In some embodiments, a terminal obtains the audio information corresponding to a voice input that is input to the terminal (e.g., via a microphone of the terminal). In some embodiments, a terminal obtains the audio information corresponding to a voice input that is input to another terminal and such other terminal provides (e.g., communicates) information pertaining to the voice input to the terminal that obtains the audio information. As an example, in the case of the voice input being input to a client corresponding to a basic network device (e.g., category number 1 of Table 1 hereof), a simple network device (e.g., category number 2 of Table 1 hereof), or an intermediate network device (e.g., category number 3 of table 1 hereof), the client can provide (e.g., communicate) information pertaining to the voice input to the terminal (e.g., the terminal that implements at least part of process 100).

According to various embodiments, the audio information corresponds to a processed information of the voice input. For example, the audio information is a sound recording of the voice input (e.g., that is generated by a client in response to receiving the voice input). As another example, the audio information is a text version of the voice input based on a speech-to-text processing performed with respect to the voice input.

Various embodiments include obtain audio information from a user. For example, a terminal can collect (e.g., record) audio information based on a user input. Audio information corresponding to a user can be collected via a client. For example, in response to the user performing an operation to start a recording function, the client records the corresponding voice input (e.g., speech from the user that is obtained from a microphone, etc.), and the client generates audio information based at least in part on the voice input. In some embodiments, the client automatically starts the recording function. Similarly, the client can automatically generate the audio information based at least in part on the voice input that it obtains via the recording function. The client can be configured to invoke the recording function in response to one or more defined conditions. For example, a specified condition is set for the client, and the recording function starts in response to a determination that the specified condition is met. As an example, the client stores a mapping of conditions to corresponding functions, and the mapping of conditions to corresponding functions can include the condition associated with invocation of the recording function. As an example, the condition corresponding to starting the recording function is specification of a particular time at which recording is to begin. In response to a determination that a current time corresponds to the particular time, the client starts recording at that time. As another example, the condition corresponding to starting the recording function is specification of a particular place. In response to a determination that a current location corresponds to the particular place, the client starts recording. The client can starts upon arrival at the particular place. The particular place can be defined as specific geographic coordinates, an address, or in reference to another location (e.g., within a threshold proximity of another device, connection to a particular network such as a home or work network, etc.). As another example, the condition corresponding to starting the recording function is specification of an ambient volume. In response to a determination that a current ambient volume (e.g., within proximity of the client, the volume corresponding to sounds detected by a microphone of the client, etc.), the client starts recording.

According to various embodiments, one or more pieces of audio information are generated based at least in part on voice input (e.g., obtained voice input). For example, the client that records the voice input generates one or more pieces of audio information corresponding to the voice input. In some embodiments, the client deems the entire content recorded in a single audio recording process (e.g., during invocation of the recording function such as while one or more of the corresponding conditions are satisfied) as one continuous piece of audio information. In some embodiments, the client divides one audio recording process into a plurality of pieces of audio information. As an example, the audio information corresponding to a voice input is divided according to length of recording time (e.g., each five-minute recording constitutes one piece of audio information, etc.). Various lengths of recording time can be defined as a threshold (e.g. for a corresponding piece of audio information). As another example, the audio information corresponding to a voice input is divided according to data volume (e.g., each piece of audio information is a maximum of 5 MB, etc.). Various sizes of data can be defined as a threshold (e.g. for a corresponding piece of audio information). As another example, the audio information corresponding to a voice input is divided based at least in part on a content of the voice input (or audio information). One or more keywords can be defined with respect to which different pieces of audio information are to be generated. The audio information can be divided into a plurality of pieces of information based on one or more instructions comprised in the corresponding voice input. For example, each piece of the audio information can correspond to a different one or more instructions of the voice input (e.g., if the voice input includes an instruction to turn up volume of music being played and to change the brightness of lights, two pieces of audio information can be generated—a piece for turning down the volume and a piece for changing the brightness of the lights).

At 120, a service function corresponding to the audio information is determined. In some embodiments, the terminal determines the service function based at least in part on the audio information or a piece of the audio information corresponding to the voice input. The terminal can determine the service function based at least in part on one or more keywords included in the audio information. In some embodiments, the terminal stores (or has access to) a mapping of keywords to functions. The terminal can determine that the audio information comprises one or more keywords, and determine one or more service functions corresponding to the one or more keywords based at least in part on the mapping of keywords to functions (e.g., by performing a lookup of the one or more keywords with respect to the mapping).

According to various embodiments, a speech to text is performed with respect to the voice input. The terminal can determine the service function based on the text generated based on speech-to-text processing of the voice input. For example, one or more keywords can be extracted from the text and the one or more keywords can be used in connection with determining the service function.

In some embodiments, a service instruction set including at least one service instruction is predefined. The predefined service instruction set can be stored locally at the terminal or stored remotely at a storage that is accessible to the terminal. A service instruction indicates a specific function. In response to a determination that the audio information includes a service instruction, the service function corresponding to the service instruction (e.g., the service function indicated by the service instruction) is determined to be executed. The terminal can perform the service function corresponding to the service instruction, or the terminal can instruct another terminal to perform the service function.

In some embodiments, the content of the voice input is obtained by performing a preset recognition algorithm with respect to the voice input. As an example, the preset recognition algorithm is a hidden Markov algorithm or a neural network algorithm that subjects the audio information to speech recognition.

According to various embodiments, the client may be a module integrated into various terminals. Examples of terminals in which the client is integrated include a coffee machine, a smart phone, a smart appliance, etc. In the case of the client being integrated into a coffee machine, if the user says "I want to drink coffee" to the coffee machine (e.g., within proximity of the coffee machine, or in manner that a microphone of the coffee machine obtains the voice input), the client can determine the service function indicated by the audio information to be "to make coffee." In the case of the client being a speech recognition module integrated into a smart phone, if the user says "I want to make a payment," the client can determine the service function indicated by the audio information to be "to make a payment."

In some embodiments, recognition of the service function is implemented via speech-to-text conversion technology. The audio information can be converted into corresponding text information and the service function can be determined based at least in part on the text information. For example, phonemes within the audio information are recognized (e.g., determined). In response to determining the phonemes, the phonemes within the audio information are blended according to a phoneme blending list into corresponding text information. In response to the text information being obtained from the audio information, the text information is matched against a mapping of text to service instructions or service instructions in a service instruction library. The service instructions can be stored in the service instruction library in the form of text or word vectors. Accordingly, the recognized text information can be matched against each service instruction in the service instruction library. The service instructions obtained based on matching text information corresponding to the audio information with service instructions in the service instruction library can be determined to serve as the service functions indicated by the audio information. In some embodiments, the matching of text information corresponding to the audio information with service instructions in the service instruction library comprises calculating the distances between word vectors and determining the service instruction corresponding to the voice input based at least in part on the distances between the word vectors. The matching of text information corresponding to the audio information with service instructions in the service instruction library comprises: (i) converting recognized text information into corresponding word vectors, and (ii) obtaining (e.g., determining) the Euclidean distances for the converted word vectors relative to one or more service instruction word vector in the service instruction library. In some embodiments, the Euclidean distances are determined with respect to each service instruction word vector in the service instruction library. A smaller Euclidean distance indicates greater similarity between the text information and the service instruction. Thus, the service instruction with the shortest Euclidean distance is deemed as the service function indicated by the audio information.

At 130, user information corresponding to the audio information is determined. In some embodiments, the terminal (e.g., the terminal implementing the client) determines the user information. The user information can include information corresponding to a user profile that the user has registered with a server (e.g., a web service) or an application. The user information can include information configured by the user and/or information that is determined based at least in part on the user's use of the terminal, application, and/or corresponding web service. In some embodiments, the user information includes historical information. The historical information can pertain to a user's behavior with respect to the terminal, application, and/or corresponding web service, a user's shopping history, etc. In some embodiments, the user information includes characteristics associated with the user such as identity, age, gender, location, interests, preferences, etc.

In some embodiments, the user information corresponding to the audio information is determined based at least in part on a mapping of speech features to users. Speech information pertaining to the audio information can be obtained and a lookup can be performed with respect to the speech features to users to determine the user and/or user information.

According to various embodiments, the service function corresponding to the audio information is performed based at least in part on the user information corresponding to the audio information. For example, a service (e.g., a web service, or an application service) can be provided to the user based at least in part on user information. As an example, the terminal performs the service function in response to determining the user information corresponding to the audio information. As another example, the terminal provides an instruction to another terminal or device to perform the service function in response to the terminal determining the user information corresponding to the audio information.

In some embodiments, speech features of the user are associated with identity information (e.g., user information) of the user or with a user profile corresponding to the user (e.g., a defined user profile that is registered with the terminal, application, web service, etc.). In some embodiments, the terminal determines speech features comprised in, or associated with, the audio information. In response to determining the speech features, the terminal determines the user corresponding to the audio information (e.g., the user corresponding to the voice input).

In some embodiments, the audio information of voice input is obtained (e.g., collected) according to an audio information collection method. The audio information collection method can include recording speech input based on a user inputting a voice input. The speech input can be recorded based on an input to a microphone of the terminal. As an example, the audio information can include audio data. In some embodiments, the audio data is a recording of the user's speaking voice. The audio information collection method can include generating a speech feature vector corresponding to the audio information (e.g., the audio data). In some embodiments, the speech feature vector generated according to audio information corresponds to a characterization of the audio information and characterizes one or more of the voice qualities of the user (e.g., pronunciation, cadence, pitch, stress, etc.). Because each person's growth and development process differs in each of its components, a user's speaking voice will have definite voice qualities. Accordingly, the one or more voice qualities of users can be used to differentiate between different users. According to various embodiments, speech feature vectors (e.g., corresponding to audio information) are used in connection with identifying users (e.g., by characterizing one or more of voice qualities of users).

According to various embodiments, one or more voice qualities of a user are stored in association with a user or a user profile. For example, the terminal or server (e.g., a server associated with a web service) stores the one or more voice qualities pertaining to a user in association with a user profile that has been created (e.g., registered) for the user. The user can configure the user profile to include the one or more voice qualities. For example, during registration or editing of the user profile, the user can configure the user profile to include the one or more voice qualities by recording one or more speech samples. The terminal or server can determine the one or more qualities to associate with the user (e.g., to store in association with the corresponding user profile) based at least in part on characterizing the one or more speech samples. In some embodiments, the terminal or server update the user profile based on one or more voice qualities that are obtained in connection with the user's activity. For example, the terminal or server update the user profile based on one or more voice qualities that are obtained in connection with the user's historical use of the terminal or web service (e.g., a user's historical voice inputs). In some embodiments, a user feature vector can be determined based at least in part on information associated with a user profile for a user. The user feature vector can be used in connection with characterizing one or more characteristics corresponding to a user.

In some embodiments, each user has a corresponding user information or user profile. The user information or user profile can be associated with an account (e.g., a registered account with an application or a service such as a web service or a software as a service account). In some embodiments, the account can be associated with a plurality of users (e.g., user information or user profiles). Accordingly, although a plurality of users are associated with a single account (e.g., a family account), a particular user corresponding to the account who input a voice input (e.g., the audio information) can be determined based on the audio information.

In some embodiments, one or more pieces of audio information are collected in relation to a user. An audio information processing method can be used with respect to a piece of audio information to generate a corresponding speech feature vector. For example, each piece of audio information obtained with respect to a voice input of a user can be subject to the audio processing method to obtain the corresponding speech feature vector. In some situations, a plurality of pieces of audio information simultaneously undergo calculations and processing in accordance with the audio information processing method in order to obtain one or more corresponding speech feature vectors. In some embodiments, a speech feature vector correspond to a plurality of pieces of audio information.

According to various embodiments, a user feature vector is used to identify a user. For example, a user feature vector corresponding to a particular user is determined based at least in part one or more characteristics associated with the user. In some embodiments, the user feature vector is determined based at least in part on the obtained speech feature vector. As an example, if only one speech feature vector is generated with respect to the obtained audio information, then that speech feature vector is determined to correspond to the user feature vector of the user. As another example, if a plurality of speech feature vectors are generated, a speech feature vector that expresses more of the voice qualities of the user may be selected from the plurality of speech feature vectors and determined to be the user feature vector of the user. According to various embodiments, if a plurality of speech feature vectors are generated (e.g., based at least in part on the audio information), one or more of the plurality of speech vectors are further processed in connection with determining (e.g., outputting) a user feature vector corresponding to the user. The further processing on the one or more of the plurality of speech feature vectors in order to output a user feature vector of the user include, but are not limited to, calculating a mean (e.g., a mean speech vector) in connection with summing the corresponding dimensions of the one or more of the plurality of speech feature vectors. In some embodiments, the processing the one or more of the plurality of speech feature vectors includes determining (e.g., computing) a representative speech vector of the user based at least in part on the one or more of the plurality of speech vectors. The representative speech vector can correspond to a statistical representation (e.g., an average, a median, a mean, etc.) of the one or more of the plurality of speech vectors. Various other computations can be performed with respect to the one or more of the plurality of speech vectors. For example, a weighted sum of two or more of the plurality of speech feature vectors can be determined in connection with the processing of the two or more of the plurality of speech vectors.

In some embodiments, the user feature vector is used in connection with determining a user (e.g., determining an identity or user profile associated with a user corresponding to the user feature vector, determining an identity or user profile associated with a user corresponding to the voice input, etc.).

In some embodiments, the user feature vector of the user is associated with identity information of the user. For example, the use feature vector is associated with a user profile for the user (e.g., a user profile that the user has registered with a server (e.g., a web service) or an application, etc.). User identity information can be used to indicate a single user. For example, the user identity information can be unique for each user (e.g., each user that uses the terminal, each user that has registered with the server, web service, application, etc.). According to various embodiments, identity information of the user includes one or more of a username, a nickname, a true name, an identity card, a gender, contact telephone number, an email address, a contact address, a user profile (or identifier thereof), etc. In some embodiments, a user feature vector is stored in association with a user in response to the user feature being determined (e.g., by the terminal or a server such as a web server with which the client communicates, etc.). A user can be determined (e.g., identified) based at least in part on a correlation between (i) the speech feature vector determined based at least in part on the audio information, and (ii) the user feature vector. For example, in response to obtaining the audio information (e.g., based on a voice input obtained from the user), the user can be determined using the association of user feature vectors with identity information. The association of user feature vectors with identity information can correspond to a mapping of user feature vectors to identity information for users.

Figure 2:
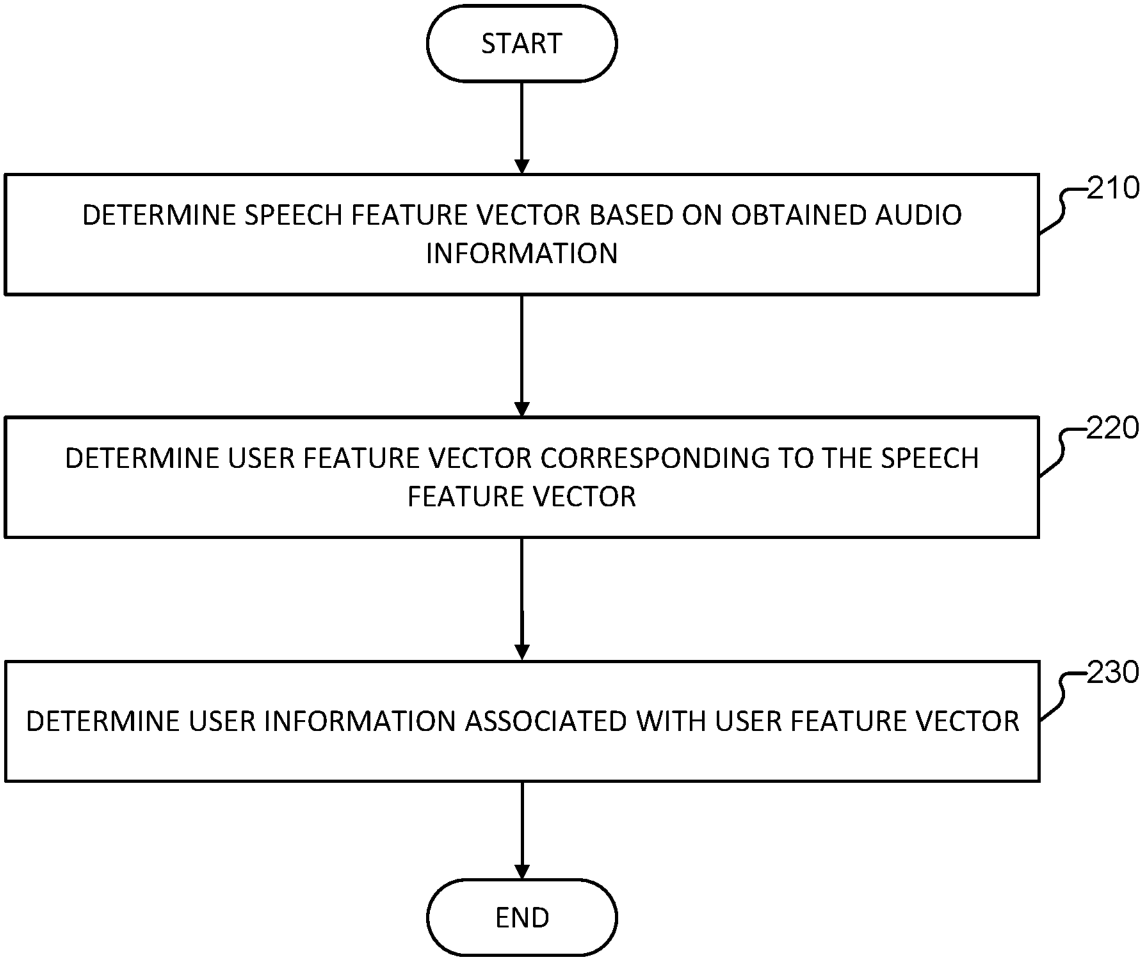
FIG. 2 is a flowchart of a method of determining user information according to various embodiments of the present application.

FIG. 2 is a flowchart of a method of determining user information according to various embodiments of the present application.

Referring to FIG. 2, process 200 for determining user information is provided. Process 200 can be implemented in connection with process 100 of FIG. 1, process 700 of FIG. 7, process 800 of FIG. 8, and/or process 900 of FIG. 9. Process 200 can be implemented at least in part by computer system 1000 of FIG. 10.

According to various embodiments, process 200 is implemented by a terminal. As an example, the terminal that implements process 200 corresponds to a client that is a simple network device, an intermediate network device, a smart network device, or a high-performance network device. In some embodiments, process 200 is performed by one or more servers (e.g., one or more servers connected to a terminal used by a user).

At 210, a speech feature vector is determined based at least in part on audio information. In some embodiments, one or more feature vectors are determined (e.g., generated) based at least in part on obtained audio information. The audio information used in connection with determining the speech vector can correspond to a voice input obtained from a user. The voice input is obtained from a terminal, and the terminal or a server or other terminal with which the terminal communicates determines the audio information.

In some embodiments, the audio information used in connection with determining the speech vector is based on a voice input for which the user is prompted to input. A client can prompt a user to input a particular voice input. As an example, the client prompts a user to read a particular text (e.g., the client can cause a terminal to display text information that the user is to speak). As another example, the client prompts the user to input an answer to a question (e.g., a predefined question or a question selected from among a plurality of predefined questions). In some embodiments, the audio information used in connection with determining the speech vector is based on a voice input the content of which is not prompted. For example, the audio information can correspond to a voice input that is not constrained by the client. The user can input a random voice input, or the user can select the voice input. The audio information can be obtained by the client based at least in part on a recording of sounds detected by a microphone of the client (e.g., a passive recording of sounds, or a recording in response to an input by the user corresponding to a request to invoke recording).

In some embodiments, the client generates a speech feature vector in response to receiving audio information of the user. As an example, the user controls the client in connection with obtaining information about a product or service (e.g., the user provides one or more inputs to the client with respect to requesting information pertaining to a product or service). The client can provide information pertaining to the product or service based at least in part on audio information. For example, an identity of the user can be determined based at least in part on the audio information, and the information pertaining to the product or service provided to the user is based at least in part on the determined identity of the user.

According to various embodiments, a system is provided according to which information pertaining to one or more products and/or service based at least in part on one or more interactions between a user and a client included in the system. The system can include one or more servers with which the client communicates to obtain the information pertaining to the one or more products or services. As an example, a user can learn the details and parameters of different products or services through a dialogue with the client. The user can interact with the client via one or more voice inputs and the client can provide (or cause another terminal to provide) an output with respect to information obtained based at least in part on the one or more voice inputs. In some embodiments, in response to a determination that the user is to make a purchase (e.g., based on an input of the user), the client generates the speech feature vector, and determines the identity information corresponding to the user (e.g., based at least in part on the speech feature vector. In some embodiments, the client generates the speech feature vector and determines the identity information corresponding to the user in response to a determination that the voice input corresponds to a request for information (e.g., information that is obtained based at least in part on an identity of the user. In an example where the client is a smart speaker, a user may say to the smart speaker, "I want to drink coffee." The client (or a server with which the client is in communication) can process the voice input use speech recognition to recognize the content expressed by the user. The smart speaker (or a server with which the smart speaker is in communication) generates the speech feature vector corresponding to the voice input based at least in part on the processing of the voice input using speech recognition to determine content of the voice input.

The generating of a speech feature vector corresponding to audio information (e.g., the voice input) includes generating a feature matrix based on the audio information. The generating of the feature matrix can include obtaining (e.g., extracting) data from the audio information according to a preset algorithm and determining (e.g., outputting) a feature matrix that includes features of audio data from the audio information. A user's voice or speech includes features such as timbre, intonation, and talking speed. The features that characterize a user's voice or speech are generally unique to the user or can otherwise be used in connection with identifying the user from numerous other users. A user's own voice features can be characterized (e.g. embodied) in terms of frequency, amplitude, etc. in the audio data in connection with recording the audio information. The feature matrix generated from the audio information according to a preset algorithm includes audio data features in the audio information (e.g., timber, intonation, talking speed, etc.). A speech feature vector can generated based at least in part on the feature matrix. The speech feature vector generated using the feature matrix can be used to characterize the audio information and audio data. Various preset algorithms can be used in connection with generating the feature matrix. Examples of the preset techniques include Mel Frequency Cepstrum Coefficient (MFCC), Mel Frequency Spectral Coefficient (MFSC), Fractional Mel Frequency Cepstrum Coefficient (FMFCC), Dynamic Mel Frequency Cepstral Coefficients (DMFCC), Linear Prediction Cepstrum Coefficient (LPCC), etc. Other preset techniques can be implemented in connection with generating an audio information feature matrix.

The generating the speech feature vector can further include performing a dimension reduction processing. For example, after the feature matrix has been generated, dimension reduction processing is performed on the feature matrix according to multiple feature dimensions. The dimension reduction processing can be performed in order to obtain multiple dimension values used to represent feature dimensions. According to various embodiments, the multiple dimension values (e.g., obtained via the dimension reduction processing) form the speech feature vector. In some embodiments, dimension reduction processing is performed with respect to the feature matrix according to different feature dimensions to obtain dimension values capable of characterizing each feature dimension. A speech feature vector can be generated by arranging dimension values in a specified sequence. In some embodiments, a dimension reduction processing is performed with respect to a feature matrix using a convolution or mapping algorithm. Various algorithms or processes can be used in connection with performing dimension reduction on a feature matrix. For example, dimension reduction can be performed with respect to a feature matrix according to different dimensions using Deep Neural Network (DNN), Convolutional Neural Network (CNN), Recurrent Neural Network (RNN), deep learning, or a combination of the algorithms above.

According to various embodiments, the generating the speech feature vector includes performing endpoint detection processing. For example, audio information can be differentiated into user speech audio data and non-user speech audio data. The endpoint detection processing can be used in connection with determining the user speech audio data and the non-user speech audio data comprised in the audio information. The data corresponding to non-user speech audio data can be reduced in the feature matrix. For example, the speech feature vector includes performing the endpoint detection processing based at least in part on the audio information to determine user-speech audio data and non-user speech audio data, and excluding the non-user speech audio (or at least a portion of the non-user speech audio) from the speech feature vector. Accordingly, a correlation between the generated speech vector and the user can be increased to a certain extent. For example, non-user speech audio data from the audio information based on the endpoint detection processing. Various algorithms or processes can be used to implement endpoint detection processing. Examples of endpoint detection processing methods may include, but are not limited to, energy-based endpoint detection, cepstrum feature-based endpoint detection, information entropy-based endpoint detection, and autocorrelation similarity distance-based endpoint detection.

At 220, the user feature vector corresponding to the speech feature vector is determined. In some embodiments, in response to determining the speech feature vector based at least in part on the obtained audio information, the user feature vector corresponding to the determined speech vector is determined. The corresponding user feature vector can be determined by the client that obtained the audio information, or by a terminal or server with which the client communicates. The user feature vector can be determined by matching the speech feature vector with the corresponding user feature vector. For example, the corresponding feature vector can be determined based at least in part on performing a search (e.g., a lookup) of a user feature vector that is the same as the speech feature vector. As anther example, the corresponding feature vector can be determined based at least in part on performing a search (e.g., a lookup) of a user feature vector having a threshold degree of similarity as the speech feature vector. In some embodiments, the threshold degree of similarity is a measure of a minimum degree of similarity required for a user feature vector to be deemed a match with a speech feature vector. A degree of similarity can be computed according to various statistical measures. The degree of similarity between the speech feature vector and a user feature vector can be computed by computing a degree of similarity of one or more characteristics in the speech feature vector with a corresponding one or more characteristics in the user feature vector.

According to various embodiments, a user feature vector is used to identify a user. For example, a user feature vector corresponding to a particular user is determined based at least in part one or more characteristics associated with the user.

At 230, user feature information associated with the user feature vector is determined. In some embodiments, the terminal determines a user corresponding to the audio information based at least in part on the user feature vector. For example, the terminal determines an identity of the user based on the user feature information associated with the user feature vector.

In some embodiments, the user feature vector is used in connection with determining a user (e.g., determining an identity or user profile associated with a user corresponding to the user feature vector, determining an identity or user profile associated with a user corresponding to the voice input, etc.). The user feature information can include an identifier associated with a user or a user profile associated with the user.

According to various embodiments, the user feature information is used in connection with providing one or more services to the corresponding user. For example, information to be provided to the user (e.g., in response to the voice input corresponding to the audio information) is configured or obtained based at least in part on the user feature information. Information provided to the user in response to the voice input (e.g., the audio information) can be personalized for the particular user that input the voice input. Accordingly, the user that input the voice input is determined based at least in part on the audio information. For example, a speech feature vector is determined based at least in part on the audio information, and a user feature vector that matches the speech feature vector is determined. The user can be identified based at least in part on the determined user feature vector. For example, the terminal can store, or have access to, a mapping of user feature vectors to users.

In response to determining the user feature information, the user corresponding to the audio information is determined, and information is provided to the user based at least in part on the audio information and the user information. For example, information provided to the user can be based at least in part on a type of information requested in connection with the audio information, and the information is configured or obtained based at least at least in part on a particular user corresponding to the voice input.

In some embodiments, a user feature vector for the user is set in advance in accordance with a user-registered method. The client, or a terminal or server with which the client communicates, stores the user feature vector in association with the user. Accordingly, the client can verify user identities by matching speech feature vectors with user feature vectors.

According to various embodiments, matching speech feature vectors with corresponding user feature vectors includes performing pair-based calculations. A speech feature vector-user feature vector pair is deemed to be a match if the pair conforms to a predefined relationship. In some embodiments, the performing pair-based calculation includes determining a match value corresponding to a speech feature vector-user feature vector pair. The matching of a speech feature vectors with a corresponding user feature vector includes comparing the match value to a set threshold value. If the match value is less than or equal to the set threshold value, the speech feature vector is deemed to match the user feature vector. In some embodiments, the match value is determined by computing a difference between the speech feature vector and the user feature vector (e.g., an absolute value of the difference can be determined). For example, the user feature vector can be subtracted from the user feature vector, and the result of such subtracting can correspond to the match value. In some embodiments, the match value is determined by computing a summation of the speech feature vector and the user feature vector. If the speech feature vector is added to the user feature vector, and the resulting numerical value is deemed to be the match value. The match value can compared to a set threshold value. If the match value is greater than or equal to the set threshold value, the speech feature vector is deemed to match the user feature vector.

According to various embodiments, the client stores a plurality of user feature vectors corresponding to a plurality of users. The plurality of users can have an associate user profile. In response to obtaining the speech feature vector of the current user, the client can compare the obtained speech feature vector with the plurality of user feature vectors corresponding to the plurality of users. For example, the client can compare the obtained speech feature vector to the plurality of user feature vectors one at a time. The client can determine the user feature vector corresponding to the speech feature vector based at least in part on the comparison of the obtained speech feature vector to the plurality of user feature vectors. In some embodiments, the client obtains a corresponding match value in connection with a comparison of the speech feature vector with each of the plurality of user feature vectors. In some embodiments, the user feature vector corresponding to the largest match value is deemed to be the matched user feature vector. In response to determining the user feature vector corresponding to the speech feature vector, the client deems the identity information associated with the user feature vector as the identity information of the user. For example, the client stores a mapping of identity information to user feature vectors, and the client can look-up the identity information of the user based at least in part on the user feature vector matched to the speech feature vector and the mapping of identity information to user feature vectors. In some embodiments, the client uses the identity information in connection with providing information (e.g., a response to the voice input) to the user.

In response to determining the identity information of the user (e.g., the user corresponding to the audio information), the identity information is associated with characterization information. According to various embodiments, the characterization information is used in connection with indicating one or more characteristics of the user. As an example, the characterization information is obtained based at least in part on historical data pertaining to the user. The characterization information can be obtained via analysis of historical data relating to the user. For example, the analysis of the historical data relating to the user can be one or more statistical analyses. One or more preferences of the user can be determined based at least in part on the analysis of the historical data relating to the user. In some embodiments, the characterization information includes one or more user preferences for the user. For example, the characterization information indicates a drink preference (e.g., the user prefers drinking lattes), a pay preference (e.g., the user usually pays with WeChat Pay when making offline payments), a travel preference (e.g., the user generally chooses routes that avoid congestion when navigating), a mode of transportation preference, a vendor preference (e.g., a coffee shop that the user usually visits), etc. Various other characteristics (e.g., preferences) pertaining to the user (or the historical information for the user) can be included in the characterization information.

Process 100 of FIG. 1 and/or process 200 of FIG. 2 can further include using the user information associated with the user feature vector in connection with providing a service (e.g., information) to the user. For example, in response to determining the user information associated with the user feature vector, the terminal configures a service based at least in part on the user information. For example, the terminal uses the characterization information as an input to a service function, and performs the service function. In some embodiments, the service function corresponds to a function for providing a user with a response to the voice input. The service function can include obtaining and/or configuring information that is responsive to the user input or performing one or more services (e.g., controlling a smart appliance, etc.) that corresponds to a request of the voice input.

According to various embodiments, the terminal determines a service function corresponding to the audio information. The service function can be determined based at least in part on one or more keywords in the audio information, the characterization information pertaining to the user, etc. In some embodiments, in response to determining the service function indicated by the audio information of the user and determining the characterization information corresponding to the user, the client uses the characterization information as input data for executing the service function. The client determines an implementation mode corresponding to the characterization information, and performs the service function in the implementation mode. For example, if the client is a terminal that makes (or orders coffee (or the client is connected to such a terminal), and the obtained audio information (e.g., corresponding to the voice input of the user) is "I want to drink coffee," then the client determines the characterization information corresponding to the user based at least in part on the audio information, and determines that the characterization information indicates that the user prefers to drink lattes. Therefore, in connection with executing the service function of making coffee, the client makes (or orders) latte and thus complies with the preference of the user.

In some embodiments, in connection with determining the service function corresponding to (e.g., indicate by) the audio information, a determination is made as to whether the audio information includes a start keyword. For example, the client can determine whether the audio information comprises the start keyword. The "start keyword" can be a designated word or phrase to activate the client. In some embodiments, the client determines the service function indicated by the audio information only in response to determining that the audio information includes the start keyword. The start keyword can correspond to an input in response to which providing a service responsive to a voice input is invoked. For example, if the audio information does not include the start keyword the user will not be disturbed by the client while engaged in the user's normal work life (e.g., when the user is not requesting information from the client). If the user desires to use the client (e.g., to obtain a service from the client), the user can initiate interaction with the client by issuing a start instruction to the client (e.g., a voice input comprising the start keyword, pressing a physical button on the corresponding terminal, etc.).

In some embodiments, the client operates in a standby mode according to which the client obtains (e.g., records) audio information from the user's speech in order to determine whether the user has issued a start instruction to the client. As an example, determining that the user input a start instruction can include determining that the user has said, "Hello, XYZ." In response to the client determining that the user has said, "Hello, XYZ," the client starts the interaction process.

According to various embodiments, generating the speech feature vector corresponding to the audio information includes at least one of the following: selecting any one or more pieces of audio information of the user, and generating the speech feature vector based at least in part on the selected one or more pieces of audio information; or providing specified information to the user and generating the speech feature vector based at least in part on the speech information input by the user according to the specified information.

In some embodiments, the audio information on the basis of which the speech feature vector is generated varies depending on the context. In the context of a simple service function, the speech feature vector is generated according to audio information obtained by recording user speech in order to achieve the objective of rapidly executing the service function. Examples of a simple service function context include the context of a request to play a song, a request to change a brightness level of a smart appliance, a request to change a volume of a playback, etc.

In some embodiments, in the case of a relatively complex context or a context that has relatively high factor of safety requirements, specified information set by the user is recorded and used in connection with generating the speech feature vector. As an example, the client (or a server associated with a service provided by the client) prompts the user to input speech using predefined information (e.g., the user is prompted to say a predefined phrase), and information is obtained by recording the user inputting speech corresponding to the predefined information. The specified information can be a prerecorded piece of text, a sentence, or a simulated sound without particular meaning. Examples of input of specified information include the user uses speaking the user's own birthday as the specified information, the user speaking the user's name as the specified information, the user mimicking a bird call as the specified information. In this way, after the user issues speech information used in connection with characterizing a service function, the client provides speech prompt information. The speech prompt information can indicate the corresponding speech information that the user is to input (e.g., generate) in accordance with the specified information. For example, the client may output (e.g., via sound or text): "Please read the following content at normal talking speed: XYZ." In response to receiving the speech information input according to the specified information, the client generates a semantic feature vector (e.g., corresponding to the user) based on the speech information. The semantic feature vector can be used in connection with identifying a user based on voice input (e.g., the obtained audio information). For example, the processing of the obtained specified information input by the user is used to accurately recognize identity information of a user. Examples of a complex context include an offline payment.

The audio information obtained by the client may not be accurate or precise as to the instruction or function being desired by the user. For example, the audio information may not contain a clear indication of an operation instruction. In response to obtaining the audio information, the client can determine that the audio information corresponds to a plurality of service functions (e.g., a plurality of service functions are to be invoked in response to the voice input). In cases where the desired instruction is not clear from the audio information, the client can determine that a plurality of service functions are possibly the service function being requested by the user. For example, in the case of the audio information corresponding to a user statement of "turn on," the user does not instruct the client as to what device is to be turned on. In some embodiments, in such cases, the client provides prompt speech information to the user. The prompt speech information can be provided via audio or text. The prompt speech information provided by the client can include an indication of multiple service functions (e.g., from which the user is to select a service function as corresponding to the obtained audio information). For example, the prompt speech information can correspond to "what do you wish to turn on? 1. Window 2. Door 3. Air conditioning 4. Television set. Please choose." In response to the prompt speech information being provided, the user can input a selection instruction. The user can issue a speech selection instruction with respect to the prompt speech information. For example, the user may say: "Window" or "1". In response to receiving the speech selection instruction, the client determines the service function based at least in part on the speech selection instruction. The service function can be determined based at least in part on the speech selection instruction and the audio information (e.g., the initially obtained audio information with respect to which the prompt speech information was provided).

In some embodiments, the characterization information includes user preference data pertaining the user. The characterization information can include user preference data pertaining to the service function (or generally to the service corresponding to the audio information). For example, if the service function is "payment," the user preference data relating to the service function is "WeChat Pay." Thus, the client selects WeChat Pay (e.g., from a plurality of forms of payment with which the client is configured to implement) in order to implement the payment process. In some embodiments, the client provides the user with a speech confirmation information based at least in part on the user preference data. For example, in response to determining the service function and/or one or more characteristics pertaining to the service function such as an implementation of the service function (e.g., the implementation of the preferred payment method), the client provides the user with a confirmation of the determined service function and/or one or more characteristics pertaining to the service function. The client can await final confirmation from the user before performing the service function. In response to receiving confirmation from the user, the client performs the service function. As an example, after determining that the preferred form of payment for the user is "WeChat Pay," the client may outputs: "Do you wish to use WeChat Pay?" In response to receiving the speech confirmation instruction (e.g., from the user), the client executes the service function based at least in part on the user preference data. For example, if the user provides the client with the response "Yes" the client adopts the WeChat Pay to complete the payment process.

According to various embodiments, the client provides one or more service to users that have not registered with the client, application running on the terminal, and/or a web service that is provided to the client (e.g., by one or more servers). If the user corresponding to the audio information has not registered with the client, or if the client has no identity information of the user, then the client will be unable to determine the identity information of the user based on the audio information. Nonetheless, in some embodiments, the client provides the user with a service (e.g., information responsive to the audio information). In the case of that the user has not registered with the client or the client does not have any stored identity information of the user, the client will be unable to obtain the characterization information pertaining to the user, and the client will be unable to execute a service function relating to the preference of the user (e.g., the service function provided to the user will not be configured or obtained with reference to a particular preference of the user). In response to obtaining audio information and determining that the client does not have stored identity information of the user corresponding audio information or that the user has not registered with the client, the client can invoke an option information set associated with the service function. The invoking of the option information set associated with the service function can include obtaining a set of possible service functions corresponding to (e.g., responsive) to the audio information, providing information associated with at least a subset of the set of possible service functions to the user, and obtaining (e.g., receiving) a selection of at least one of the possible service functions from the user. The option information comprised in the option information set (e.g., the set of possible service functions) can represent implementations of the service function. For example, if the service function is "make coffee", the implementations associated with the service function include "make latte," "make cappuccino," "make caramel coffee" etc. The user can provide at least part of the option information in the option information set to the user. For example, the client can prompt the user to select at least one of the options in the option information set. The user can select an option via inputting a voice input. Selection of an option can be input via other implementations (e.g., a touch screen, a physical button, etc.). After the user issues a selection instruction (e.g., a speech selection instruction), the client receives the selection instruction. The selection instruction can indicate the target option information in the option information set (e.g., the option with which the user desires the service function to be performed). For example, in the case above, the user's choice (e.g., the target option information) can correspond to "make caramel coffee." In response to receiving the selection instruction (e.g., the target option information), the client performs the service function according to the implementation corresponding to target option information. Using the example above, in response to receiving the target option information "make caramel coffee" from the user, the client invokes a process for making caramel coffee. For example, the client can make the caramel coffee or provide another terminal with an instruction to make caramel coffee.

Figure 3:
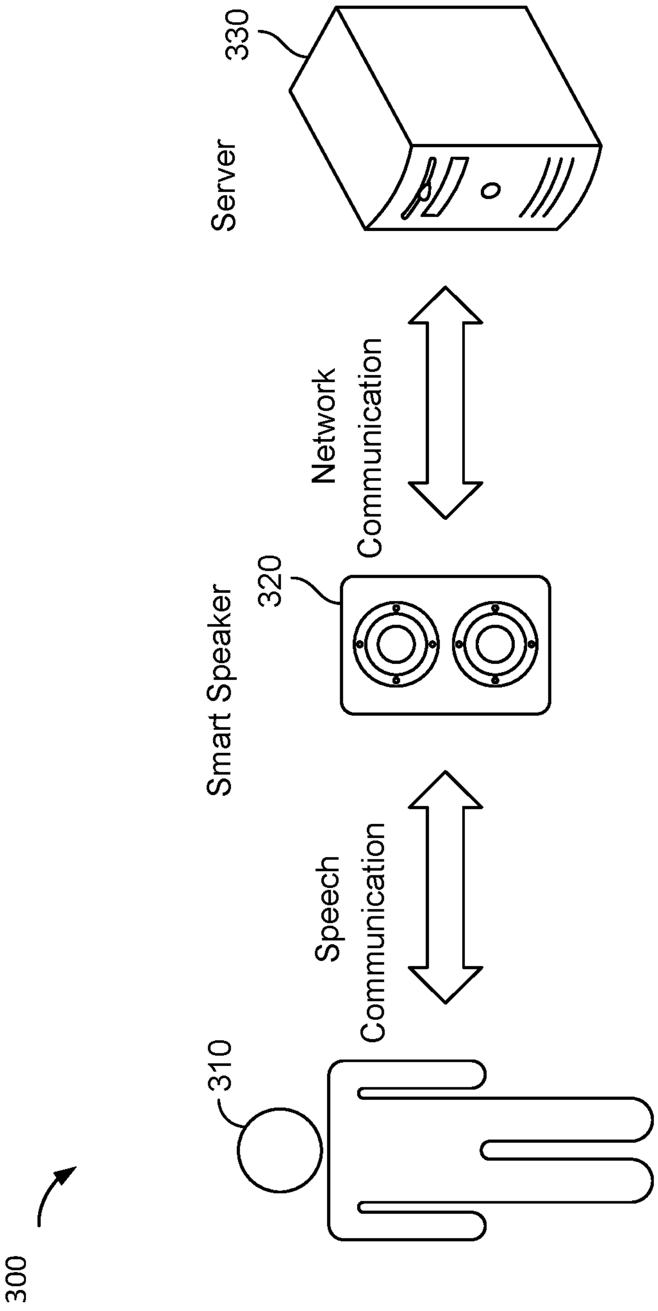
FIG. 3 is a diagram of a system for interacting with a smart speaker according to various embodiments of the present application.

FIG. 3 is a diagram of a system for interacting with a smart speaker according to various embodiments of the present application Referring to FIG. 3, system 300 for interacting with a smart speaker is provided. System 300 can implement process 100 of FIG. 1, process 200 of FIG. 2, process 700 of FIG. 7, process 800 of FIG. 8, and/or process 900 of FIG. 9. Process 100 can be implemented at least in part by computer system 1000 of FIG. 10.

System 300 includes a terminal 320 and server 330. According to various embodiments, terminal 320 is a smart appliance such as a smart speaker. Terminal 320 and server 330 can communicate via one or more networks (e.g., the Internet, etc.). In some embodiments, user 310 interacts with system 300. For example, user 310 interacts with terminal 320 via one or more interfaces. The one or more interfaces can include a speech interface according to which the user provides a voice input (e.g., speaks within proximity of the terminal 320). Terminal 320 can obtain the voice input from the user and perform one or more corresponding operations. In some embodiments, terminal 320 provides user 310 with one or more services in response to user 310 providing a voice input to terminal 320.

Terminal 320 of system 300 can correspond to or comprise a client that is a smart home device. The client can have a certain level of calculating capability. For example, the client can correspond to a device of category 3 described in Table 1 hereof (e.g., a smart appliance, smart speaker, etc.). In the case of system 300 being implemented at least in part in a home of the user 310, the client can be smart speaker. According to various embodiments, the smart speaker can include a microphone, a speaker, a WiFi module, memory, a processor, etc. The smart speaker can implement audio playing functions. In some embodiments, the smart speaker (e.g., terminal 320) includes a processing device and network device to implement shopping functions via voice input/output with the user 310 and to implement communication of data with server 330.

In some embodiments, one or more keywords (e.g., wake-up words) are used to activate the smart speaker. For example, the smart speaker performs a monitoring of sound in the area surrounding the smart speaker (e.g., via monitoring inputs to the microphone of the smart speaker) and activates (e.g., wakes-up) in response to determining that the sound detected by the smart speaker includes the one or more keywords. As an example, the smart speaker operates in stand-by mode prior to determining that a wake-up word is input (e.g., spoken) by the user 310. The one or more keywords used to activate the smart speaker can be used to activate the speaker to operate in a mode according to which user 310 can interact with the smart speaker (e.g., to request and/or obtain services from the smart speaker). As an example, if user 310 wants to use the smart speaker, user 310 can say "Hello, speaker." In response to determining that at least one of the one or more keywords used to activate the smart speaker is input (e.g., spoken within range of the smart speaker), the smart speaker system provides a response to the user. The response can be provided through a speaker of the smart speaker. An example of a response provided by the smart speaker is: "Hello, do you need help?"

In the example above, if user 310 wishes to purchase an air purifier, the voice input from the user could be "I would like to buy an air purifier. What do you recommend?" In response to the voice input, the smart speaker generates audio information (e.g., through the microphone), and the smart speaker can identity information corresponding to the audio information. According to various embodiments, the identity information is associated with preference data of the current user (e.g., user 310). For example, a profile of the current user can be stored at the client or at a server in communication with the client, and the profile can be associated with historical data associated with the current user. The preference data can include an indication of a preference for brands, types of features, colors, etc. Continuing with the example above, the smart speaker determines that the user is interested in Midea and Xiaomi products. Therefore, the smart speaker system can provide recommendations to the user based at least in part on the preference data of the current user. For example, the smart speaker can output the following speech through its speaker: "I have two recommendations: the first is the Xiaomi Air Purifier 2S; the second is Midea's KJ210G-C46 air purifier." In response to receiving the recommendations from the smart speaker, user 310 can provide a voice input responsive to the recommendations. For example, user 310 provides selection with respect to the recommendations. As another example, user 310 can provide information for a further refinement of the recommendations. In response to the recommendations, user 310 may say, "I want to buy the Xiaomi Air Purifier 2S." In response to the selection input by the user, the smart speaker can invoke the purchasing process flow for the corresponding product. For example, the smart speaker can perform (or instruct another terminal or server to perform) the purchasing process flow to purchase the Xiaomi Air Purifier 2S.

According to various embodiments, the smart speaker is connected to an online shopping platform (e.g., one or more servers that provide online shopping). The smart speaker may implement different functions based on a configuration of the smart speaker. For example, the smart speaker can have only a speech input function. In such a case, in response to obtaining the audio information corresponding to a voice input of user 310, the smart speaker communicates the audio information over to the server for processing. In some embodiments, the smart speaker is configured to implement some processing functions. For example, the smart speaker can obtain obtaining the audio information corresponding to a voice input of user 310 and obtain a service function and/or identity information corresponding to the audio information. In response to obtaining the service function and/or identity information, the smart speaker can communicate the service function and/or identity information to server 330 for additional processing (e.g., the server can determine the recommendations based at least in part on the service function and/or the identity information, and communicate the recommendations to the smart speaker to provide such to user 310). One or more steps in the interaction process can be completed separately in the smart speaker and the server.

Figure 4:
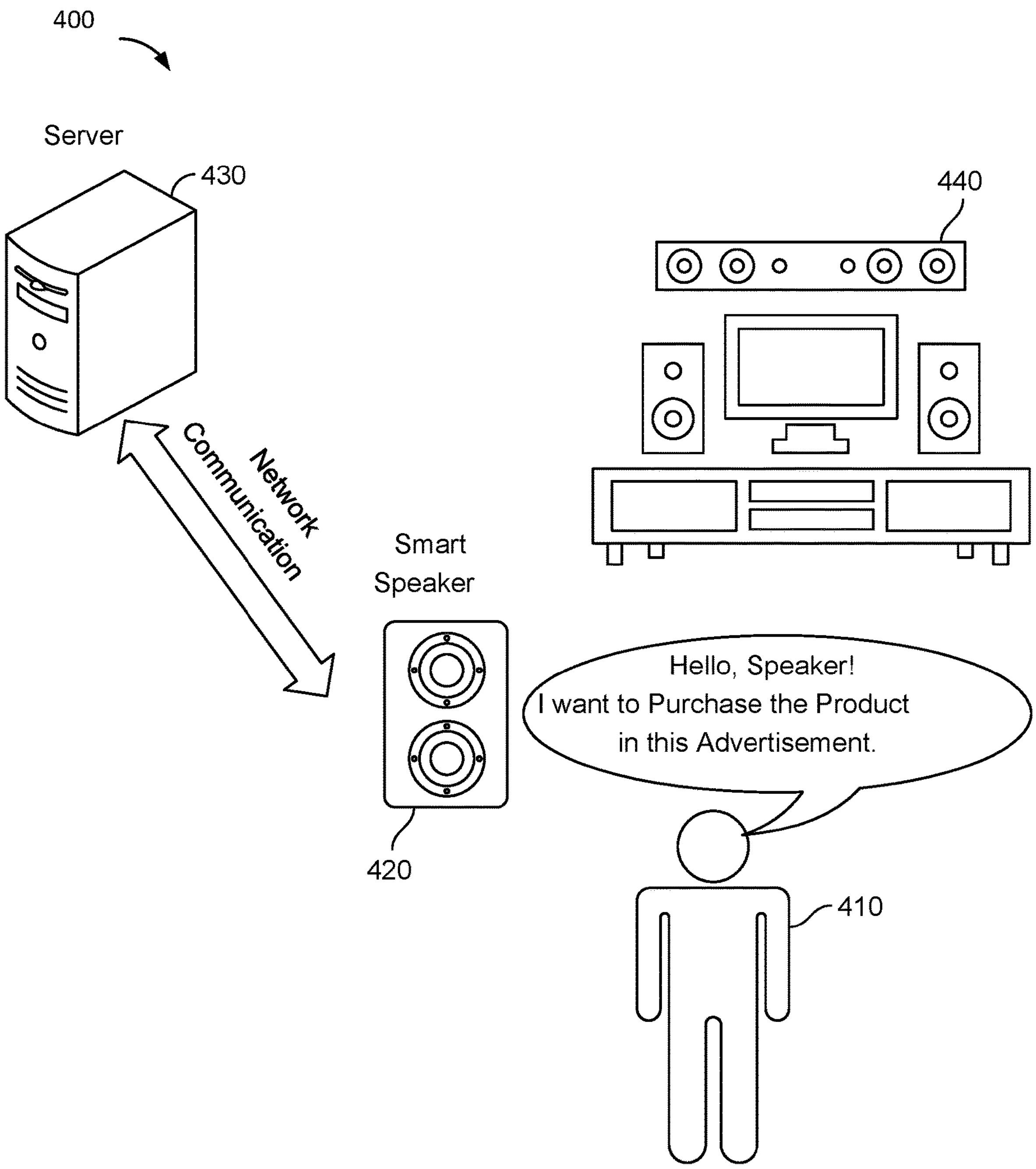
FIG. 4 is a diagram of a system for interacting with a smart speaker according to various embodiments of the present application.

FIG. 4 is a diagram of a system for interacting with a smart speaker according to various embodiments of the present application.

Referring to FIG. 4, system 400 for interacting with a smart speaker is provided. System 400 can implement process 100 of FIG. 1, process 200 of FIG. 2, process 700 of FIG. 7, process 800 of FIG. 8, and/or process 900 of FIG. 9. Process 100 can be implemented at least in part by computer system 1000 of FIG. 10.

System 400 includes a terminal 420, a server 430, and a playback device (e.g., an entertainment terminal such as a TV, etc.) 440.

According to various embodiments, terminal 420 is a smart appliance such as a smart speaker. Terminal 420 and server 430 can communicate via one or more networks (e.g., the Internet, etc.). In some embodiments, user 410 interacts with system 400. For example, user 410 interacts with terminal 420 via one or more interfaces. The one or more interfaces can include a speech interface according to which the user provides a voice input (e.g., speaks within proximity of the terminal 320). Terminal 420 can obtain the voice input from the user and perform one or more corresponding operations. In some embodiments, terminal 420 provides user 410 with one or more services in response to user 410 providing a voice input to terminal 420. Playback device 440 can be connected to smart speaker 420 and/or server 430 via one or more networks. In some embodiments, smart speaker 420 obtains information pertaining to media being played back. For example, in the case of the playback device 440 being a smart TV, the smart TV can provide the smart speaker 420 with information indicating a product or service being advertised, a movie or show currently being played, a product or service included in a frame being played back, etc.

Terminal 420 of system 400 can correspond to or comprise a client that is a smart home device. According to various embodiments, the client is configured to proactively predict the products or services of interest to the user.

As an example, smart speaker 420 is located in the living room of the home of user 410. While the television 440 is on (e.g., playing back a media), smart speaker 420 can record the television audio. Smart speaker 420 can obtain audio information corresponding to the television audio, and thereupon determine the channel code or corresponding media being played back. In some embodiments, the smart speaker uses the television audio or channel code and/or corresponding media that is played back (e.g., the television program content) in connection with interacting with the server 430. In response to receiving the television audio or channel code and/or corresponding media that is played back from smart speaker 420, server 430 provides information to smart speaker 420. For example, the server provides the corresponding television channel to smart speaker 420 as feedback.

In the example above, smart speaker 420 stores a television channel program list. In some embodiments, smart speaker 420 obtains a television channel program list from the server. While watching television, user 410 may become interested in an advertisement's product and want to purchase such product. Accordingly, user 410 at this point may say, "Hello, speaker. I want to purchase the product in this advertisement." In some embodiments, the phrase "Hello, speaker" can be used to activate the smart speaker 420 (e.g., to indicate to the smart speaker 420 that user 410 wants to interact with the smart speaker 420 to obtain one or more services). In response to the voice input from user 420, smart speaker 420 determines information on the product user 410 wants to buy based at least in part on information of the media being played back. For example, smart speaker 420 can determine the information on the product user 410 wants to purchase based on the time point when user 410 spoke (e.g., issued the voice input) and the corresponding time given in the program list. In some embodiments, the smart speaker 420 generates a speech feature vector (e.g., a speech feature file) based on audio information corresponding to the voice input and uses the speech feature vector to match and verify the identity of user 410. For example, the smart speaker 420 matches the speech feature vector with corresponding information associated with user 420. In response to determining that verification of user 410 is successful, personal information pertaining to user 410 (e.g., preference data, etc.) and product information are sent to server 430. In response to receiving the personal information and product information, the server processes a purchase of the corresponding product or service. The personal information and the product information can be sent to server 430 in connection with a request to perform a purchase process. Server 430 makes a payment from the financial account of user 410 to the seller of the product at the price in the product information.

Figure 5:
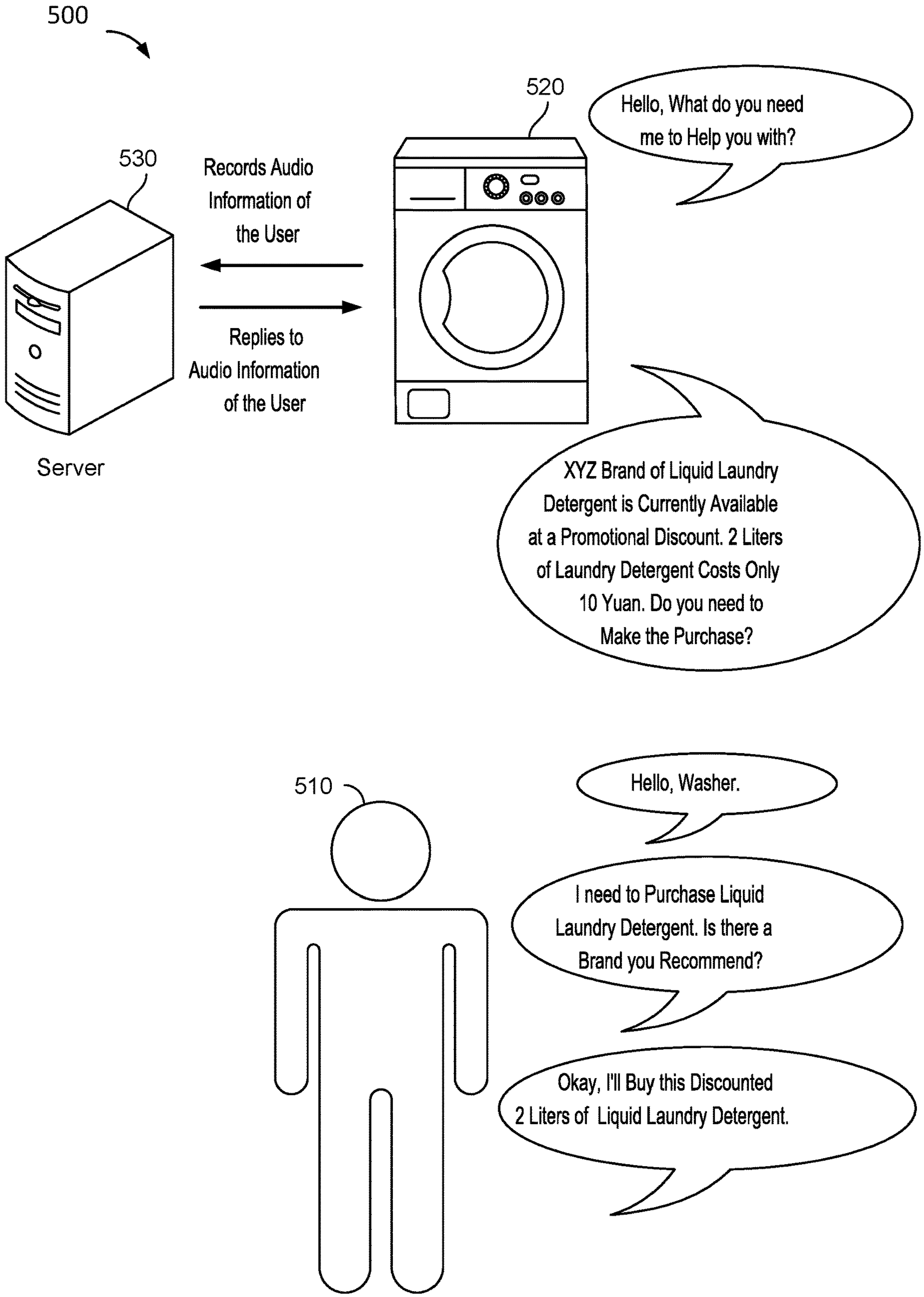
FIG. 5 is a diagram of a system for interacting with a smart washer according to various embodiments of the present application.

FIG. 5 is a diagram of a system for interacting with a smart washer according to various embodiments of the present application.

Referring to FIG. 5, system 500 for interacting with a smart washer is provided. System 500 can implement process 100 of FIG. 1, process 200 of FIG. 2, process 700 of FIG. 7, process 800 of FIG. 8, and/or process 900 of FIG. 9. Process 100 can be implemented at least in part by computer system 1000 of FIG. 10.

System 500 includes a terminal 520 and server 530. According to various embodiments, terminal 520 is a smart appliance such as a smart washer. Terminal 520 and server 530 can communicate via one or more networks (e.g., the Internet, etc.). In some embodiments, user 510 interacts with system 500. For example, user 510 interacts with terminal 520 via one or more interfaces. The one or more interfaces can include a speech interface according to which the user provides a voice input (e.g., speaks within proximity of the terminal 520). Terminal 520 can obtain the voice input from the user and perform one or more corresponding operations. In some embodiments, terminal 520 provides user 510 with one or more services in response to user 510 providing a voice input to terminal 520.

Terminal 520 of system 500 can correspond to or comprise a client that is a home Internet of Things device with data collection capability. For example, the client can correspond to a device of category 1 described in Table 1 hereof. In the case of system 500 being implemented at least in part in a home of user 510, the client can be a smart washer. In addition to implementing the functions of a washer, the smart washer 520 may can have one or more sensors, a WiFi module, a microphone, a speaker, etc. The one or more sensors of smart washer 520 can include a temperature sensor for sensing the ambient temperature of the washer, a rotational speed sensor for sensing the rotational speed of the pulsator or drum of the washer. The microphone can be configured to record audio data (e.g., to obtain voice input from the user, etc.). The speaker can be configured to play audio data provided to smart washer 520 by server 530.

In the current example, the microphone of smart washer 520 records audio data and is connected to a home network via a WiFi module. Smart washer 520 communicates the audio data to server 530. Server 530 can provide smart washer 520 information that is responsive to the audio data obtained by smart washer 520. For example, server 530 provides audio data as feedback to smart washer 520. In response to receiving the feedback from server 530, smart washer 520 outputs corresponding information. For example, smart washer 520 plays the audio data it obtained as feedback from server 530 through a speaker of smart washer 520. One or more other output interfaces can be used to provide a user with the information smart washer 520 obtained from server 530 (e.g., a display, etc.).

As an example, user 510 can interact with smart washer 520 in connection with making a purchase (e.g., for a product pertaining to the smart washer 520 such as detergent). If user 510 does not have liquid laundry detergent at home and needs to purchase some, user 510 can say to the washer: "Hello, washer." The microphone of smart washer 520 will record this voice input as audio information and provides the audio information to server 530 via one or more networks (e.g., the Internet, WiFi, etc.). In response to receiving the audio information, server 530 determines that the audio information corresponds to one or more keywords to activate the smart washer 520. For example, the server 530 can perform speech recognition with respect to the audio information and determine that the audio information comprises wake-up words. In response to determining that the audio information comprises the wake-up words (e.g., the one or more keywords for activating the smart washer 520), the server sends audio information to washer 520. In response to receiving the audio information (e.g., feedback with respect to the wake-up words) from the server 530, smart washer 520 outputs the audio information. For example, smart washer 520 outputs through its speaker: "Hello, what do you need me to help you with?" User 510 can say, "I need to purchase liquid laundry detergent. Is there a brand you recommend?" In response to receiving the audio information, the smart washer 520 provides the audio information to server 530, which in turn determines information responsive to the audio information. For example, server 530 performs speech recognition and semantic analysis to obtain the request input by the user, and obtains a brand to recommend to the user. Server 530 provides the responsive information (e.g., the recommendation) to smart washer 520. The responsive information can be in the form of audio information for the smart washer 520 to play via a speaker (e.g., so as to reduce any processing requirements of the smart washer 520). In response to receiving the responsive information, smart washer 520 replies to user 510: "XYZ brand of liquid laundry detergent is currently available at a promotional discount. 2 liters of laundry detergent costs only $10. Do you need to make the purchase?" User 510 may reply, "Okay, I'll buy this discounted 2 liters of liquid laundry detergent." In response to receiving the audio information (e.g., the purchase instruction from the user 510), smart washer 520 provides the audio information to server 530. In response to receiving the audio information, server 520 determines that the audio information corresponds to an instruction to purchase the recommended product. For example, server 530 performs one or more of speech recognition and semantic analysis with respect to the audio information and determines that the user agrees to purchase this recommended product.

Figure 6:
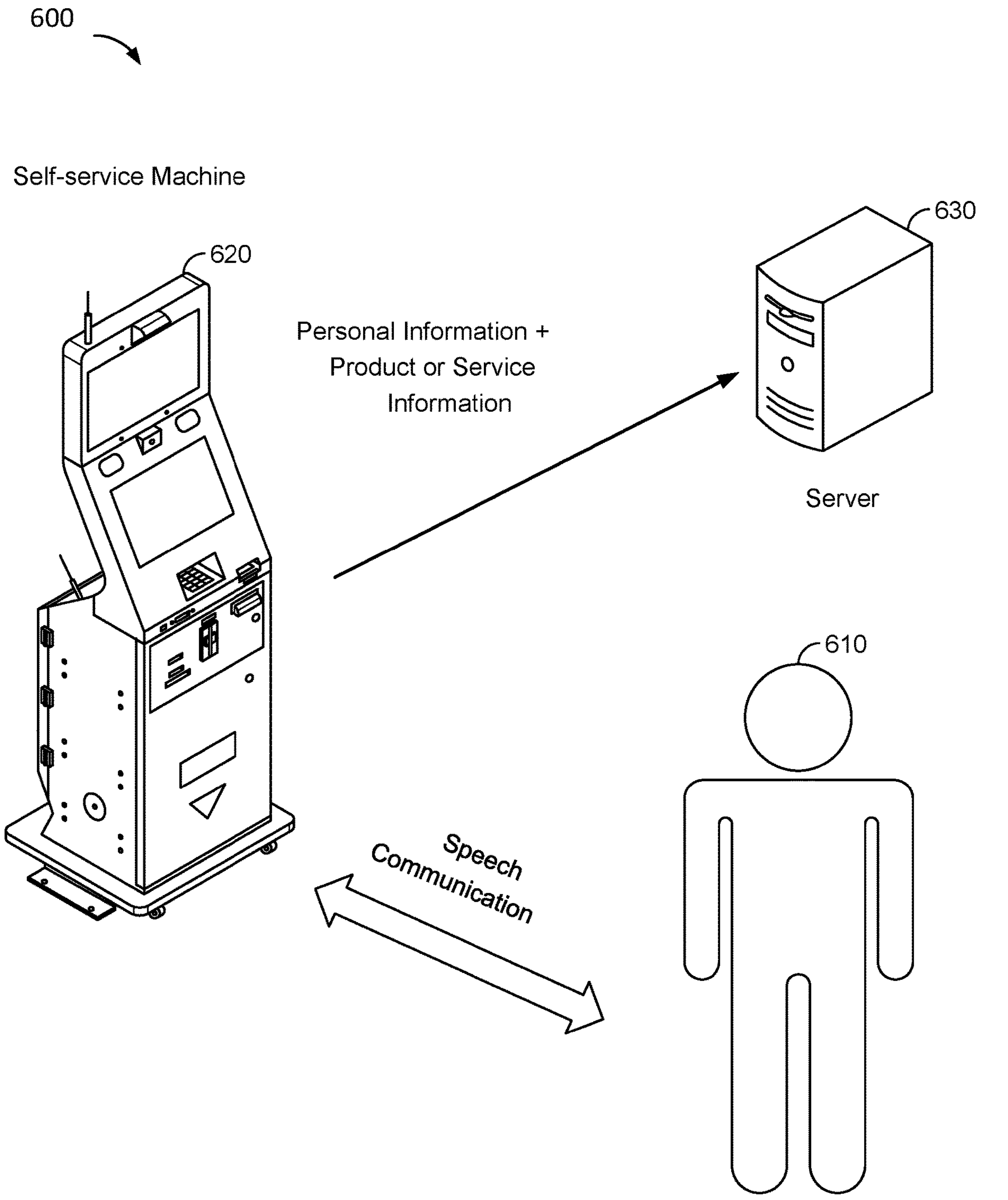
FIG. 6 is a diagram of a system for interacting with an automatic service machine according to various embodiments of the present application.

FIG. 6 is a diagram of a system for interacting with an automatic service machine according to various embodiments of the present application.

Referring to FIG. 6, system 600 for interacting with an automatic service machine is provided. System 600 can implement process 100 of FIG. 1, process 200 of FIG. 2, process 700 of FIG. 7, process 800 of FIG. 8, and/or process 900 of FIG. 9. Process 100 can be implemented at least in part by computer system 1000 of FIG. 10.

System 600 includes a terminal 620 and server 630. According to various embodiments, terminal 620 is an automatic service machine. Terminal 620 and server 630 can communicate via one or more networks (e.g., the Internet, etc.). In some embodiments, user 610 interacts with system 600. For example, user 610 interacts with terminal 620 via one or more interfaces. The one or more interfaces can include a speech interface according to which the user provides a voice input (e.g., speaks within proximity of the terminal 620). Terminal 620 can obtain the voice input from the user and perform one or more corresponding operations. In some embodiments, terminal 620 provides user 610 with one or more services in response to user 610 providing a voice input to terminal 620.

Terminal 620 of system 600 can correspond to or comprise a client that is a public service device with very powerful processing capabilities. For example, the client can correspond to a device of category 5 described in Table 1 hereof. In the case of system 600 being implemented at least in part in a home of user 610, the client can be a self-service machine.

As an example, the self-service machine can provide payment or registration of utility charges, Internet access fees, subscriptions to publications, and other functions. User 610 can register on the self-service machine 620. For example, user 610 can establish a user profile with respect to the self-service machine 620 or a server 630 that provides a service via the self-service machine 620. After user 610 successfully registers, the self-service machine 620 stores the user feature vector for user 610 and the personal information input by the user 610 so that the next time the user operates self-service machine 620, the identity of user 610 can be verified according to the user feature vector.

In the present example, an already registered user (e.g., user 610) operates the self-service machine 620 to subscribe to a newspaper. User 610 can input (e.g., say) to the self-service machine, "Hello, I want to subscribe to a newspaper." The self-service machine 620 records audio information and performs analysis with respect to the audio information. For example, self-service machine 620 performs speech recognition and/or semantic analysis. Based at least in part on a result of the analysis performed with respect to the audio information, self-service machine 620 determines the content (e.g., the instruction) input by the user. Self-service machine 620 can generate a voice feature vector based at least in part on the audio information and can match the voice feature vector to a user feature vector (e.g., a locally stored user feature vector) to obtain the user feature vector corresponding to the audio feature vector. Self-service machine 620 can determine the personal information of user 610 (e.g., an identity of user 610, a profile corresponding to user 610, etc.) based at least in part on determining the user feature vector corresponding to the audio feature vector. Self-service machine 620 can obtain characterization information associated with the personal information of user 610. As an example, the characterization information associated with the personal information of user 610 indicates that user 610 previously had subscribed to the Gusu Evening News. In response to performing analysis with respect to the characterization information (e.g., to provide a recommendation such as determining that the user subscribed to Gusu Evening News), the self-service machine 620 can reply to user 610, "Hello, Mr. XYZ. Do you need to subscribe to the Gusu Evening News?" User 610 can confirm the instruction to self-service machine 620 such as by saying, "Yes." In response to receiving the confirmation of the instruction from user 610, self-service machine 620 can perform one or more corresponding functions. For example, self-service machine 620 can perform subscription procedure for the Gusu Evening News.

According to various embodiments, the terminal is an electronic device that has a user interface. Examples of the electronic device include a desktop computer, a tablet, a notebook computer, a smart phone, a digital assistant, a smart wearable device, a shopping guide terminal, or a smart television set. The user can issue a service instruction to the electronic device via the user interface.

In some embodiments, the terminal is an electronic device that does not have a user interface. For example, the electronic device may be a smart speaker, a smart microphone, a set-top box, or a TV box. In such a situation, the user can use speech to interact with the electronic device. Specifically, the electronic device can obtain audio information from a user in accordance with an audio information collection method described above. The terminal can then use a service function recognizing method described above to recognize the service function indicated by the audio information. Then the terminal determines identity information of the user based on the audio information. The terminal can further determine characterization information associated with the identity information. The characterization information may include user preference data, etc. Thus, the service function preferred by the user according to the preference data of the user can be performed.

Figure 7:
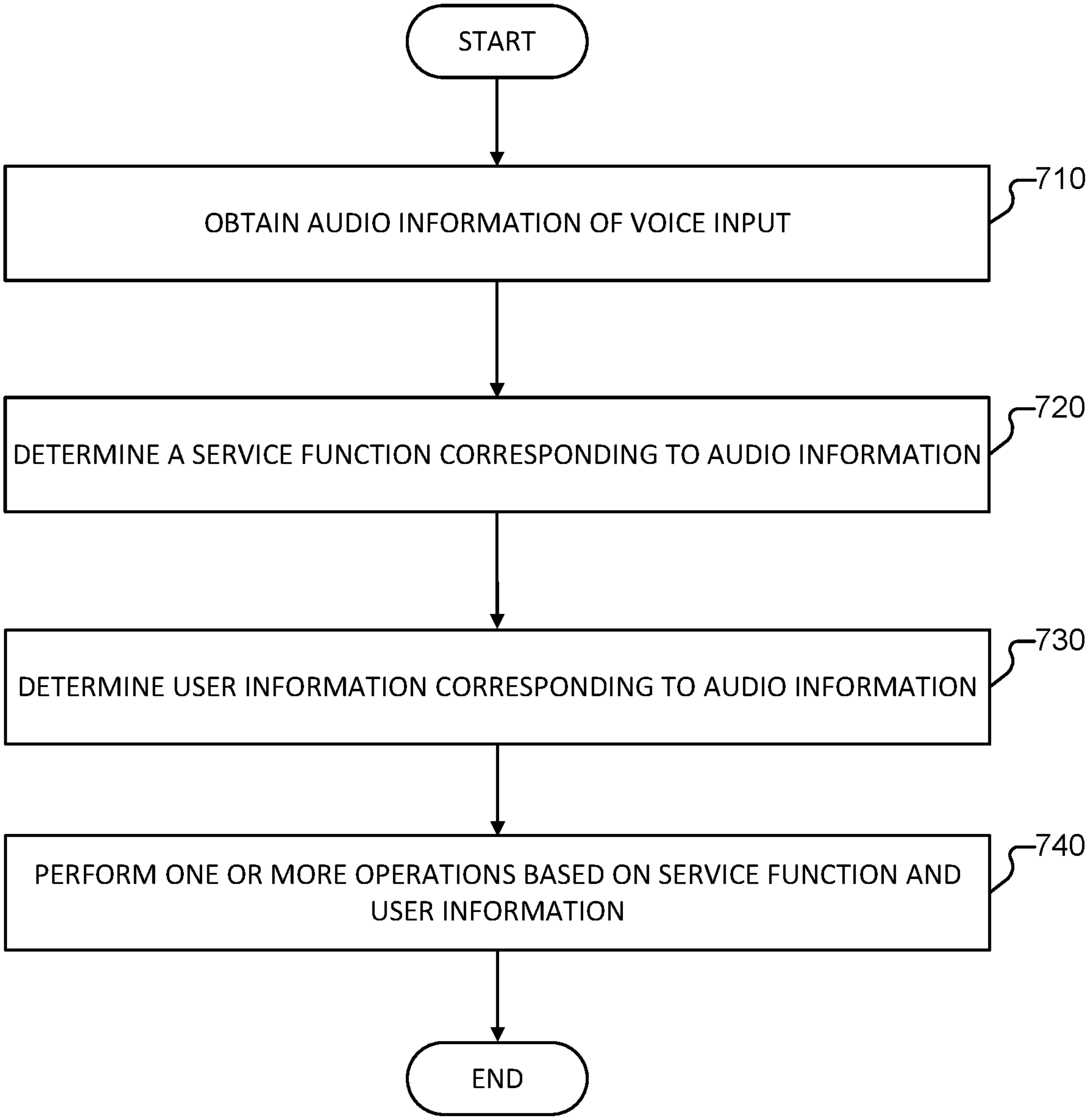
FIG. 7 is a flowchart of an interaction method according to various embodiments of the present application.

FIG. 7 is a flowchart of an interaction method according to various embodiments of the present application.

Referring to FIG. 7, process 700 for interacting with a terminal is provided. Process 800 can be implemented in connection with process 100 of FIG. 1, process 200 of FIG. 2, process 800 of FIG. 8, and/or process 900 of FIG. 9. Process 100 can be implemented at least in part by computer system 1000 of FIG. 10.

According to various embodiments, process 700 is implemented by one or more servers (e.g., one or more servers connected to a terminal used by a user).

At 710, audio information of a voice input is obtained. In some embodiments, a terminal obtains the audio information corresponding to a voice input that is input to a client (e.g., another terminal). The terminal that obtains the audio information can be a server connected to the client that obtains the voice input. The client can provide the audio information to the terminal via one or more networks.

According to various embodiments, the audio information corresponds to a processed information of the voice input. For example, the audio information is a sound recording of the voice input (e.g., that is generated by a client in response to receiving the voice input). As another example, the audio information is a text version of the voice input based on a speech-to-text processing performed with respect to the voice input.

At 720, a service function corresponding to the audio information is determined. In some embodiments, the terminal (e.g., one or more servers) determines the service function based at least in part on the audio information or a piece of the audio information corresponding to the voice input. The terminal can determine the service function based at least in part on one or more keywords included in the audio information. In some embodiments, the terminal stores (or has access to) a mapping of keywords to functions. The terminal can determine that the audio information comprises one or more keywords, and determine one or more service functions corresponding to the one or more keywords based at least in part on the mapping of keywords to functions (e.g., by performing a lookup of the one or more keywords with respect to the mapping).

At 730, user information corresponding to the audio information is determined. In some embodiments, the terminal (e.g., one or more servers such as a server in communication with the client that obtains the voice input from the user) determines the user information. The user information can include information corresponding to a user profile that the user has registered with a server (e.g., a web service) or an application. The user information can include information configured by the user and/or information that is determined based at least in part on the user's use of the client, an application, and/or corresponding web service. In some embodiments, the user information includes historical information. The historical information can pertain to a user's behavior with respect to the terminal, application, and/or corresponding web service, a user's shopping history, etc. In some embodiments, the user information includes characteristics associated with the user such as identity, age, gender, location, interests, preferences, etc.

At 740, one or more operations are performed based at least in part on the service function and the user information. In some embodiments, the terminal (e.g., a server) can provide the client that obtained the voice input from the user with one or more services (e.g., information) that are responsive to the voice input. The performing of the one or more operations based at least in part on the service function and the user information includes obtaining and/or configuring information based at least in part on the service function and the user information.

According to various embodiments, determining the service function based at least in part on the audio information comprises: converting the audio information into corresponding text information; matching the text information against service instructions in a service instruction library, and treating the service instructions obtained through matching as the service functions indicated by the audio information.

According to various embodiments, determining user information (e.g., identity information) of the user based on the audio information comprises: generating a speech feature vector based at least in part on the audio information; matching the speech feature vector with a user feature vector; and using the user information associated with the user feature vector obtained through matching as the user information of the user corresponding to the voice input.

In some embodiments, the generating a speech feature vector comprises: generating a feature matrix based at least in part on the audio information; performing dimension reduction processing with respect to the feature matrix according to a plurality of feature dimensions to obtain a plurality of dimension values used to represent feature dimensions. In some embodiments, the plurality of dimension values correspond to speech feature vector.

In some embodiments, determining the service function based at least in part on the audio information comprises: determining whether the audio information includes a start keyword; determining based at least in part on the audio information the service function indicated by the audio information only if start keyword is included in the audio information.

In some embodiments, if at least two service functions determined to correspond to audio information, the server can provide prompt speech information including the at least two service functions as feedback to the client; and the server can receive a selection instruction (e.g., a speech selection instruction) from the client (e.g., based on an input from the user). The server can use the service function indicated corresponding to the selection instruction as the service function recognized in the audio information.

In some embodiments, the characterization information includes user preference data with respect to the service function. In some embodiments, before the service function is performed, the server provides a speech confirmation information corresponding to the user preference data as feedback to the client; and the service function is performed in accordance with the user preference data in response to the server receiving a speech confirmation instruction from the client.

In some embodiments, if the user information (e.g., identity information) of the user cannot be determined based on the audio information, an option information set associated with the service function is invoked and the option information set is provided as feedback to the client. The option information in the option information set represents an implementation of the service function. The server can receive a selection instruction (e.g., a speech selection instruction) from the client (e.g., based on a user input). The speech selection can indicate the target option information in the option information set. In response to receiving the speech selection from the client, the server performs the service function in accordance with the implementation corresponding to the target option information.

Figure 8:
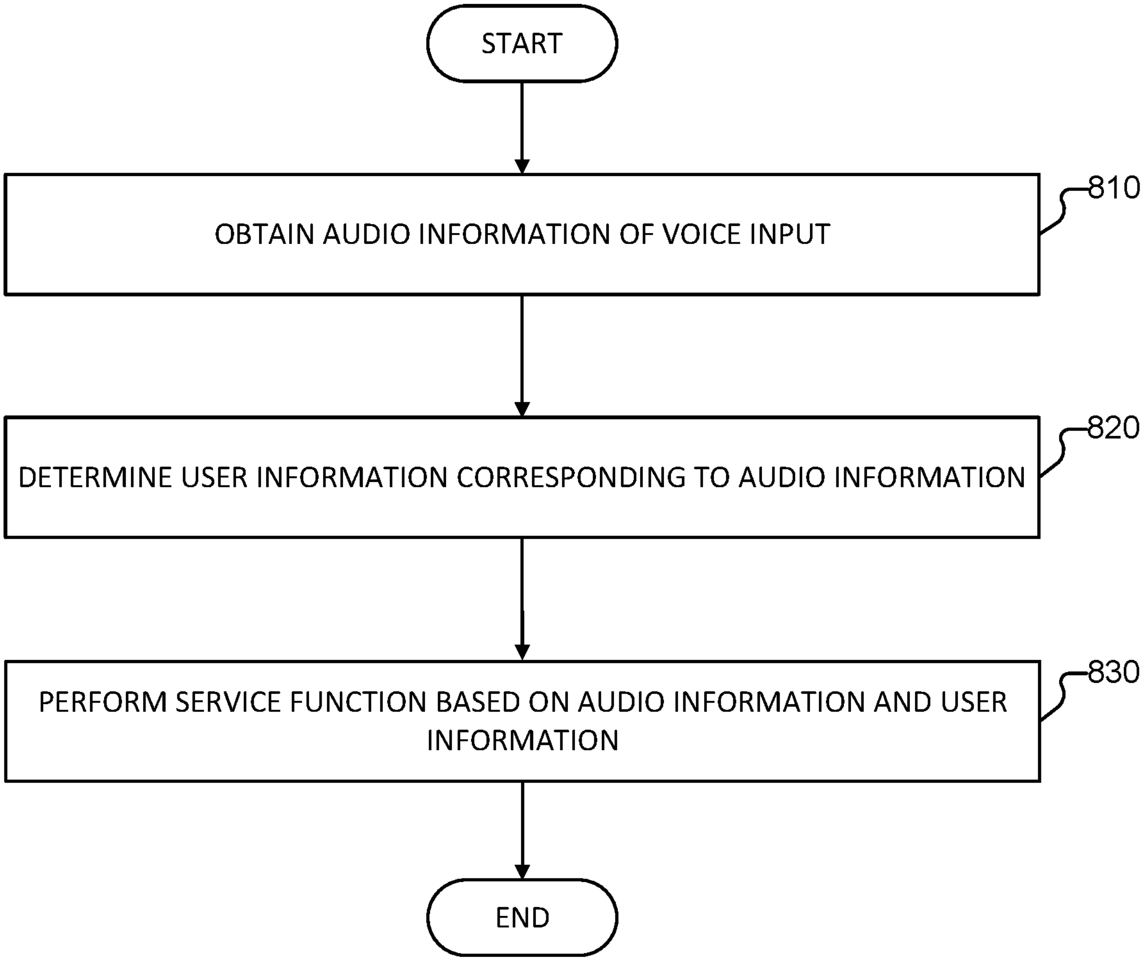
FIG. 8 is a flowchart of an interaction method according to various embodiments of the present application.

FIG. 8 is a flowchart of an interaction method according to various embodiments of the present application.

Referring to FIG. 8, process 800 for interacting with a terminal is provided. Process 800 can be implemented in connection with process 100 of FIG. 1, process 200 of FIG. 2, process 700 of FIG. 7, and/or process 900 of FIG. 9. Process 100 can be implemented at least in part by computer system 1000 of FIG. 10.

According to various embodiments, process 800 is implemented by one or more servers (e.g., one or more servers connected to a terminal used by a user).

At 810, audio information of a voice input is obtained. In some embodiments, a terminal obtains the audio information corresponding to a voice input that is input to a client (e.g., another terminal). The terminal that obtains the audio information can be a server connected to the client that obtains the voice input. The client can provide the audio information to the terminal via one or more networks. The audio information can include service function information, or service function information can be provided to the terminal (e.g., the server) from the client.

At 820, user information corresponding to the audio information is determined. In some embodiments, the terminal (e.g., one or more servers such as a server in communication with the client that obtains the voice input from the user) determines the user information. The user information can include information corresponding to a user profile that the user has registered with a server (e.g., a web service) or an application. The user information can include information configured by the user and/or information that is determined based at least in part on the user's use of the client, an application, and/or corresponding web service. In some embodiments, the user information includes historical information. The historical information can pertain to a user's behavior with respect to the terminal, application, and/or corresponding web service, a user's shopping history, etc. In some embodiments, the user information includes characteristics associated with the user such as identity, age, gender, location, interests, preferences, etc.

In response to determining the user information of the user (e.g., the user corresponding to the audio information), the identity information is associated with characterization information. According to various embodiments, the characterization information is used in connection with indicating one or more characteristics of the user. As an example, the characterization information is obtained based at least in part on historical data pertaining to the user. The characterization information can be obtained via analysis of historical data relating to the user. For example, the analysis of the historical data relating to the user can be one or more statistical analyses. One or more preferences of the user can be determined based at least in part on the analysis of the historical data relating to the user. In some embodiments, the characterization information includes one or more user preferences for the user. For example, the characterization information indicates a drink preference (e.g., the user prefers drinking lattes), a pay preference (e.g., the user usually pays with WeChat Pay when making offline payments), a travel preference (e.g., the user generally chooses routes that avoid congestion when navigating), a mode of transportation preference, a vendor preference (e.g., a coffee shop that the user usually visits), etc. Various other characteristics (e.g., preferences) pertaining to the user (or the historical information for the user) can be included in the characterization information.

At 830, a service function is performed based at least in part on the audio information and the user information. In some embodiments, the terminal (e.g., a server) can provide the client that obtained the voice input from the user with one or more services (e.g., information) that are responsive to the voice input. The performing the service function based at least in part on the audio information and the user information includes obtaining and/or configuring information based at least in part on the audio information and the user information. The service function can be performed based at least in part on the characterization information.

According to various embodiments, determining user information (e.g., identity information) of the user based on the audio information comprises: generating a speech feature vector based at least in part on the audio information; matching the speech feature vector with a user feature vector; and using the user information associated with the user feature vector obtained through matching as the user information of the user corresponding to the voice input.

In some embodiments, the generating a speech feature vector comprises: generating a feature matrix based at least in part on the audio information; performing dimension reduction processing with respect to the feature matrix according to a plurality of feature dimensions to obtain a plurality of dimension values used to represent feature dimensions. In some embodiments, the plurality of dimension values correspond to speech feature vector.

In some embodiments, the characterization information includes user preference data with respect to the service function. In some embodiments, before the service function is performed, the server provides a speech confirmation information corresponding to the user preference data as feedback to the client; and the service function is performed in accordance with the user preference data in response to the server receiving a speech confirmation instruction from the client.

In some embodiments, if the user information (e.g., identity information) of the user cannot be determined based on the audio information, an option information set associated with the service function is invoked and the option information set is provided as feedback to the client. The option information in the option information set represents an implementation of the service function. The server can receive a selection instruction (e.g., a speech selection instruction) from the client (e.g., based on a user input). The speech selection can indicate the target option information in the option information set. In response to receiving the speech selection from the client, the server performs the service function in accordance with the implementation corresponding to the target option information.

Figure 9:
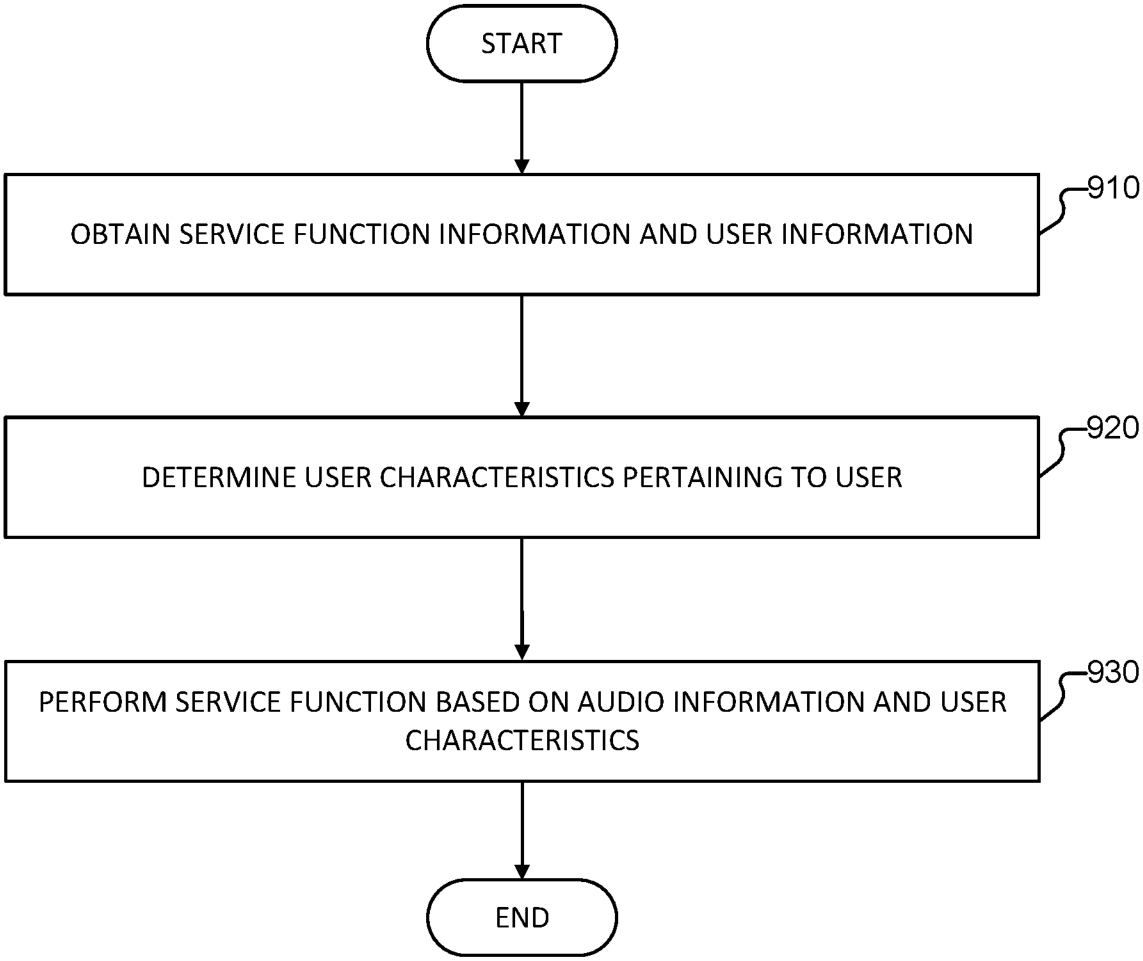
FIG. 9 is a flowchart of an interaction method according to various embodiments of the present application.

FIG. 9 is a flowchart of an interaction method according to various embodiments of the present application.

Referring to FIG. 9, process 900 for interacting with a terminal is provided. Process 900 can be implemented in connection with process 100 of FIG. 1, process 200 of FIG. 2, process 700 of FIG. 7, and/or process 800 of FIG. 8. Process 100 can be implemented at least in part by computer system 1000 of FIG. 10.

According to various embodiments, process 900 is implemented by one or more servers (e.g., one or more servers connected to a terminal used by a user).

At 910, audio information of a voice input is obtained. In some embodiments, a terminal obtains the audio information corresponding to a voice input that is input to a client (e.g., another terminal). The terminal that obtains the audio information can be a server connected to the client that obtains the voice input. The client can provide the audio information to the terminal via one or more networks. The audio information can include service function information, or service function information can be provided to the terminal (e.g., the server) from the client.

At 920, one or more user characteristics pertaining to the user are determined. In some embodiments, the terminal (e.g., a server) determines the one or more characteristics pertaining to the user based at least in part on the user information and/or the service function. For example, the server can determine the characterization information for the user.

At 830, a service function is performed based at least in part on the audio information and the one or more characteristics pertaining to the user. In some embodiments, the terminal (e.g., a server) can provide the client that obtained the voice input from the user with one or more services (e.g., information) that are responsive to the voice input. The performing the service function based at least in part on the audio information and the one or more characteristics pertaining to the user obtaining and/or configuring information based at least in part on the audio information and the one or more characteristics pertaining to the user. The service function can be performed based at least in part on the characterization information. The one or more characteristics pertaining to the user can include user preference data. The user preference data can be preference data for the particular service function corresponding to the audio information.

In some embodiments, the characterization information includes user preference data for the service function. The server can provide confirmation information (e.g., speech confirmation information) based at least in part on the user preference data as feedback to the client, and the server can receive a confirmation instruction (e.g., a selection) from the client with respect to the confirmation information. In response to receiving the confirmation instruction, the server can perform the service function in accordance with the user preference data.

In some embodiments, the server receives service function information and characterization information from a client in connection with the client receiving a client request. The characterization information can indicate one or more characteristics of a user.

The server can use the characterization information in connection with performing the service function corresponding to the service function information.

Figure 10:
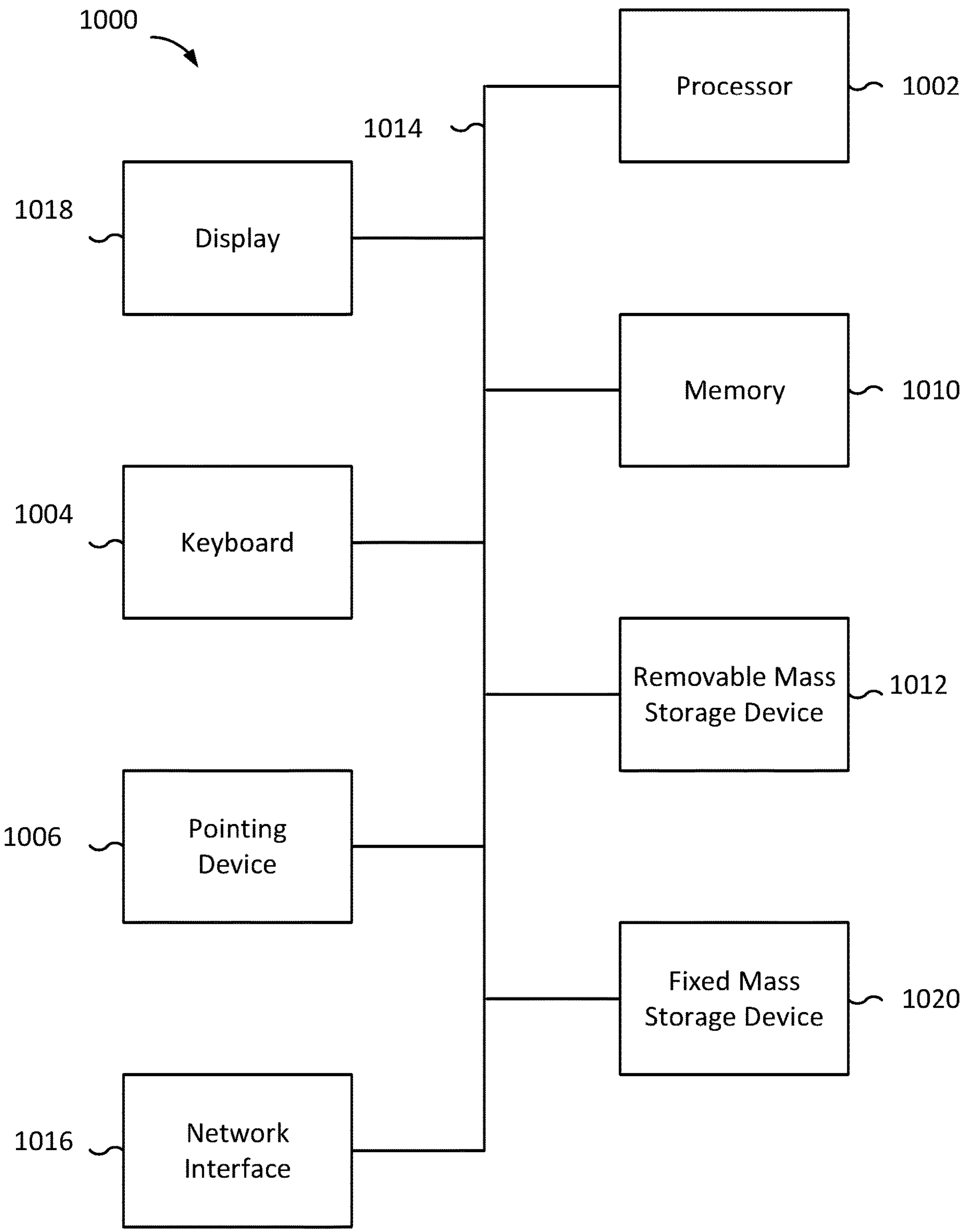
FIG. 10 is a functional diagram of a computer system for interacting with a user according to various embodiments of the present application.

FIG. 10 is a functional diagram of a computer system for interacting with a user according to various embodiments of the present application.

Referring to FIG. 10, computer system 1000 is provided. Computer system 1000 can implement at least part of process 100 of FIG. 1, process 200 of FIG. 2, system 300 of FIG. 3, system 400 of FIG. 4, system 500 of FIG. 5, system 600 of FIG. 6, process 700 of FIG. 7, process 800 of FIG. 8, and/or process 900 of FIG. 9.

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data, and objects used by the processor 1002 to perform its functions (e.g., programmed instructions). For example, memory 1010 can include any suitable computer-readable storage media, described below, depending on whether, for example, data access needs to be bi-directional or uni-directional. For example, processor 1002 can also directly and very rapidly retrieve and store frequently needed data in a cache memory (not shown). The memory can be a non-transitory computer-readable storage medium.

A removable mass storage device 1012 provides additional data storage capacity for the computer system 1000, and is coupled either bi-directionally (read/write) or uni-directionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storage device 1012 and fixed mass storage 1020 generally store additional programming instructions, data, and the like that typically are not in active use by the processor 1002. It will be appreciated that the information retained within mass storage device 1012 and fixed mass storage 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a network interface 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

According to various embodiments, a Bluetooth mesh network is provided in which a control request obtained from a user is provided to the server. The server selects a suitable Bluetooth gateway for the control request with respect to implementing control over the to-be-controlled device. Various embodiments solve the communication problem in Bluetooth mesh networks comprising multiple Bluetooth gateways. As a result, implementing a Bluetooth mesh network comprising multiple Bluetooth gateways is possible. With the above approach, the use of a plurality of Bluetooth gateways can therefore cover even more Bluetooth devices. Various embodiments solve (or at least improve) the defect of communication dead spots caused by constraints on the Bluetooth mesh network coverage range.

Accordingly, various embodiments further provide a computer-readable medium storing computer programs. When executed, the computer programs are capable of implementing all the steps executable by a server in the method embodiments described above.

Memory 1010 of computer system 100 of FIG. 10 can take the form of any type of volatile or non-volatile storage device or combination thereof. Examples include static random access memory (SRAM), electrically erasable programmable read-only memory (EEPROM), erasable programmable read-only memory (EPROM), programmable read-only memory (PROM), read-only memory (ROM), magnetic memory, flash memory, magnetic disks, and optical disks.

Computer system 1000 of FIG. 10 can include a communication component that is configured to facilitate wired or wireless communication between the device on which the communication component is located and other devices. The device where the communication component is located may access wireless networks based on a communications standard such as Wi-Fi, 2G, 3G, or a combination thereof. In an exemplary embodiment, the communication component receives via broadcast channels broadcast signals or broadcast-related information from external broadcast management systems. In an exemplary embodiment, said communication component further comprises a near-field communication module for promoting short-range communication. For example, it can be achieved in the NFC module on the basis of radio-frequency identification (RFID) technology, Infrared Data Association (IrDA) technology, ultra-wide band (UWB) technology, Bluetooth (BT) technology, and other technology.

Display 1018 in FIG. 10 above includes a screen, and the screen may include a liquid crystal display (LCD) or a touch panel (TP). If the screen comprises a touch panel, the screen may be implemented as a touchscreen to receive input signals from the user. The touch panel comprises one or more touch sensors to detect touch, sliding actions, and gestures on the touch panel. Said touch sensor can not only detect the boundaries of touch or slide actions, but also measure the duration and pressure related to said touch or slide operations.

Computer system 1000 of FIG. 10 can include a power supply component that is configured to provide electric power to all components in the device where the power supply component is located. The power supply component may include a power supply management system, one or more power supplies, and other components related to generating, managing, and allocating power to the device where the power supply component is located.

Said memory includes, but is not limited, random access memory (RAM), read-only memory (ROM), cache, a hard disk drive (HDD), or a memory card. Said memory may be for storing computer program instructions. A network communication unit may be set up in accordance with standards established by a communication protocol and used as an interface that conducts network connection communications.

Computer system 1000 can include a network communication port. The network communication port can be bound to different communication protocols and thus may have virtual ports sending or receiving different data. For example, said network communication port may be Port 80, which is responsible for conducting web data communications. Or it may be Port 21, which is responsible for conducting FTP data communications or Port 25, which is responsible for conducting mail data communications. In addition, said network communication port may be a physical communication interface or a communication chip. For example, it may be a wireless mobile network communication chip, such as GSM or CDMA. Or it may be a WiFi chip or a Bluetooth chip.

All of the embodiments in the present specification are described in progressive fashion. Where portions of an embodiment are the same or similar to those of another embodiment, it is sufficient to view the other. Each embodiment puts an emphasis on explaining those areas that are different from other embodiments.

It is clear from the above that technical schemes provided by one or more embodiments of the present specification may associate user identity information with user audio information. Since the voice qualities of different users often vary, it is possible to accurately recognize the identity information of a user when analyzing the audio information of that user. The identity information may contain corresponding characterization information, which may express behavioral characteristics of the user. Thus, when the user issues a spoken command to execute a service function, the service function matched with the characterization information of the user may be executed and thus appropriate service information may be accurately provided to the user.

Persons skilled in the art also know that, in addition to implementing controllers with pure computer-readable program codes, it is entirely possible to take method steps and, through logic programming, cause controllers to take the form of logic gates, switches, application specific integrated circuits, programmable logic controllers, and embedded micro-controllers in order to realize the same functions. Therefore, such a controller can be regarded as a hardware component, and devices included therein used to realize various functions may also be regarded structures within the hardware component. Or a device for realizing various functions may be regarded both as software modules that can implement methods and as structures within the hardware component.

As can be seen through the description of the embodiment above, persons skilled in the art can clearly understand that the present application can be realized with the aid of software plus the necessary common hardware platform. On the basis of such an understanding, the essence of the technical scheme of the present application, or the part that contributes to the prior art, may be embodied in the form of a software product. The computer software product may be stored in a storage medium, such as ROM/RAM, magnetic disks, or optical disks, and include some instructions used to cause a piece of computer equipment (which can be a personal computer, a server, or network equipment) to execute the methods described by the various embodiments of the present application or by certain portions of the embodiments.

Although the present application has been portrayed through embodiments, persons with ordinary skill in the art know that the present application has many variants and variations that do not depart from the spirit of the present application. It is hoped that the attached claims include these variants and variations without departing from the spirit of the present application.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:

receiving, by one or more processors, audio information based at least in part on a voice input from a user;

determining, by the one or more processors, a service function corresponding to the audio information;

in response to determining an identity of the user, determining, by the one or more processors, user information for the user based at least in part on the audio information; and performing, by the one or more processors, the service function based at least in part on the user information; and in response to determining that an identity of the user is indeterminable based on the audio information, determining an option information set associated with the service function;

providing option information to the user, wherein the option information is comprised in the option information set and represents an implementation of the service function;

receiving a selection instruction from the user, the selection instruction indicating a target option information in the option information set; and performing the service function according to the implementation corresponding to the target option information.

2. The method of claim 1, wherein the user information is associated with characterization information for the user, the characterization information pertaining to one or more characteristics of the user.

3. The method of claim 1, wherein:

the method is performed by a server that is in communication with a client;

the client obtains the voice input from the user and communicates the audio information to the server; and the client provides a response to the user based on the server performing the service function.

4. The method of claim 1, wherein the method is performed by a smart device that is configured to receive the voice input from the user via a microphone.

5. The method of claim 4, wherein the smart device locally stores the user information.

6. The method of claim 5, wherein the smart device locally stores a mapping of preference data to the user information, and performs the service function based at least in part on the preference data corresponding to the user information.

7. The method of claim 1, wherein the service function is determined based at least in part on converting the audio information to corresponding text and determining whether the corresponding text comprises one or more keywords associated with the service function.

8. The method of claim 1, wherein determining the service function based at least in part on the audio information comprises:

converting the audio information into corresponding text information;

matching the text information with one or more service instructions comprised in a service instruction library; and determining that the one or more service instructions matched with the text information correspond to the service function pertaining to the audio information.

9. The method of claim 1, wherein determining the user information for the user based at least in part on the audio information comprises:

generating a speech feature vector based at least in part on the audio information;

matching the speech feature vector with a user feature vector; and determining the user information associated with the user feature vector that matches the speech feature vector.

10. The method of claim 9, wherein the generating the speech feature vector comprises:

generating a feature matrix based at least in part on the audio information; and performing dimension reduction processing with respect to the feature matrix according to a plurality of feature dimensions to obtain a plurality of dimension values used to represent feature dimensions, wherein the plurality of dimension values corresponds to the speech feature vector.

11. The method of claim 9, wherein the generating the speech feature vector comprises at least one of:

selecting any one piece of audio information of the user in connection with generating the speech feature vector; and providing specified information to the user and using speech information input by the user according to the specified information as a basis to generate the speech feature vector.

12. The method of claim 1, wherein determining the service function indicated by said audio information comprises:

determining whether the audio information comprises a start keyword; and determining the service function indicated by the audio information if the audio information comprises the start keyword.

13. The method of claim 1, further comprising:

determining that at least two service functions correspond to the audio information;

providing prompt speech information corresponding to the at least two service functions to the user;

obtaining a selection instruction corresponding to a selection of a selected service function from the user; and determining that the selected service function corresponding to the selection instruction is a service instruction to be used in connection with performing the service function.

14. The method of claim 1, further comprising:

providing, to the user, confirmation information and user preference data pertaining to the service function, the user preference data being comprised in the user information; and in response to receiving a confirmation instruction from the user, performing the service function in accordance with the user preference data.

15. The method of claim 1, wherein the option information set comprises a plurality of different possible service functions that correspond to a request in the audio information.

16. A device, comprising:

one or more processors configured to:

receive audio information based at least in part on a voice input from a user;

determine a service function corresponding to the audio information;

in response to a determination of an identity of the user, determine user information for the user based at least in part on the audio information; and perform the service function based at least in part on the user information; and in response to a determination that an identity of the user is indeterminable based on the audio information, determine an option information set associated with the service function;

provide option information to the user, wherein the option information is comprised in the option information set and represents an implementation of the service function;

receive a selection instruction from the user, the selection instruction indicating a target option information in the option information set; and perform the service function according to the implementation corresponding to the target option information; and one or more memories coupled to the one or more processors, configured to provide the one or more processors with instructions.

17. A system, comprising:

one or more terminals; and one or more servers in communication with one or more terminals;

wherein:

the one or more terminals obtains audio information based at least in part on voice input from a user; and the one or more of the terminal and the one or more servers:

determine a service function corresponding to the audio information;

in response to a determination of an identity of the user, determine user information for the user based at least in part on the audio information, and perform the service function based at least in part on the user information; and in response to a determination that an identity of the user is indeterminable based on the audio information, determine an option information set associated with the service function;

provide option information to the user, wherein the option information is comprised in the option information set and represents an implementation of the service function;

receive a selection instruction from the user, the selection instruction indicating a target option information in the option information set; and perform the service function according to the implementation corresponding to the target option information.

18. A computer program product, the computer program product being embodied in a non-transitory computer readable storage medium and comprising computer instructions for:

receiving, by one or more processors, audio information based at least in part on a voice input from a user;

determining, by the one or more processors, a service function corresponding to the audio information;

in response to determining an identity of the user, determining, by the one or more processors, user information for the user based at least in part on the audio information; and performing, by the one or more processors, the service function based at least in part on the user information; and in response to determining that an identity of the user is indeterminable based on the audio information, determining an option information set associated with the service function;

providing option information to the user, wherein the option information is comprised in the option information set and represents an implementation of the service function;

receiving a selection instruction from the user, the selection instruction indicating a target option information in the option information set; and performing the service function according to the implementation corresponding to the target option information.

* * * * *